(12) United States Patent
Whitekettle et al.

(10) Patent No.: US 7,407,623 B2
(45) Date of Patent: Aug. 5, 2008

(54) STEAM CONDENSATE CORROSION INHIBITOR COMPOSITIONS AND METHODS

(75) Inventors: Wilson K. Whitekettle, Jamison, PA (US); Rosa Crovetto, Wayne, PA (US)

(73) Assignee: GE Betz, Inc., Trevose, PA (US)

( * ) Notice: Subject to any disclaimer, the term of this patent is extended or adjusted under 35 U.S.C. 154(b) by 569 days.

(21) Appl. No.: 10/959,025

(22) Filed: Oct. 5, 2004

(65) Prior Publication Data

US 2005/0121650 A1 Jun. 9, 2005

Related U.S. Application Data

(60) Provisional application No. 60/528,086, filed on Dec. 9, 2003.

(51) Int. Cl.
| | | |
|---|---|---|
| *C23F 11/14* | (2006.01) | |
| *C23F 11/10* | (2006.01) | |
| *C23F 11/167* | (2006.01) | |
| *A23L 3/3472* | (2006.01) | |
| *A23L 3/3526* | (2006.01) | |

(52) U.S. Cl. .............. 422/16; 422/12; 422/13; 422/14; 422/15; 422/17; 422/37; 210/755; 252/389.21; 252/394; 252/405

(58) Field of Classification Search ............ 422/16
See application file for complete search history.

(56) References Cited

U.S. PATENT DOCUMENTS

| | | | |
|---|---|---|---|
| 4,192,844 A | 3/1980 | Trace et al. | |
| 4,636,476 A | 1/1987 | Brunt et al. | |
| 4,693,866 A | 9/1987 | Feldman | |
| 5,120,357 A | 6/1992 | Eichberg et al. | |
| 5,302,321 A | 4/1994 | Akama et al. | |
| 6,585,933 B1 * | 7/2003 | Ehrhardt et al. | 422/16 |
| 2002/0164266 A1 | 11/2002 | Wachtler et al. | |
| 2005/0025661 A1 * | 2/2005 | Crovetto | 422/7 |

FOREIGN PATENT DOCUMENTS

WO    WO/9603042    2/1996

* cited by examiner

*Primary Examiner*—Joseph D Anthony
(74) *Attorney, Agent, or Firm*—Wegman, Hessler & Vanderburg

(57) ABSTRACT

Lecithin and 2-bromo-2-nitropropane-1,3 diol (BNPD) are used to inhibit corrosion in boiler steam condensate systems. Aqueous steam condensate corrosion inhibiting compositions of these components are also disclosed. BNPD is also used as a preservative in lecithin containing and in other GRAS additive containing compositions.

6 Claims, No Drawings

STEAM CONDENSATE CORROSION INHIBITOR COMPOSITIONS AND METHODS

PRIORITY CLAIM

The priority benefit of prior U.S. Provisional Patent Application Ser. No. 60/528,086 filed Dec. 9, 2003 is claimed under 35 USC §119(e).

FIELD OF INVENTION

The invention relates to compositions and methods in which 2-bromo-2-nitropropane-1,3 diol (BNPD) is used as a preservative in lecithin containing compositions and in compositions containing other GRAS additives. In a more specific aspect, the invention relates to boiler water corrosion inhibitor treatments and methods wherein lecithin and BNPD are fed to the boiler water system. The invention is particularly well suited to inhibit corrosion in the steam condensate return section of the boiler system.

BACKGROUND OF THE INVENTION

Steam condensate corrosion protection is an important aspect of plant operation. An increase in the quantity and quality of condensate results in water and heat savings for the boiler industry.

The action of dissolved gases such as oxygen and carbon dioxide leads to condensate corrosion. When carbon dioxide dissolves, it reacts with water to form carbonic acid. The acid depresses the pH of the condensate and increases corrosion of the metallurgical parts in contact with the condensate. The corrosion may become manifest as a groove or the like found especially in steam headers or condensate return units. It can often weaken the pipe wall, especially at the threaded joints thereof, and such corrosion can also contribute to an increase in copper and iron that is returned to the boiler. Obviously, increases in metal levels in the boiler water can lead to troublesome deposit formation.

Oxygen, when present in the condensate, can cause a localized type of corrosion in the form of pitting. This type of corrosion can cause accelerated failure of the associated metallurgy due to localized concentration of this pitting problem in a small area of the condensate system.

Historically, three major approaches have been used to inhibit condensate system corrosion. Neutralizing amines have been used to neutralize the carbonic acid formed in the systems via control of system pH to the range of about 7.5-9.0. Morpholine, diethyaminoethanol, and cyclohexylamine are common neutralizing amines that are in use today. Typically, these neutralizing amines provide good protection against carbonic acid attack but offer little protection against oxygen based corrosion.

Filming amines, on the other hand, provide a thin protective barrier on the metallurgy in contact with the system condensate and protect the metal surfaces against both carbonic acid and oxygen attack. Additionally, a combination of the neutralizing and filming amines combines the elevated pH approach of the neutralizing amines and the film forming function of the filming amines to neutralize carbonic acid while providing a protective barrier film.

Steam condensate lines of boiler systems used in the food and beverage industry create special problems. Generally, these cannot be treated by conventional corrosion inhibition treatments due to regulatory prohibitions. Accordingly, corrosion inhibitors that were on the GRAS (generally recognized as safe) list were initially tested by our research group. From the GRAS inhibitors tested, lecithin was chosen for further development due to its performance and dispersability in water.

Lecithin is found in all living organisms, and the commercial grades are generally isolated from soybeans. Lecithin is a mixture of diglycerides of stearic, palmitic, and oleic acids, linked to the choline ester of phosphoric acid. Since it is a natural substance, lecithin is readily biodegradable and subject to rapid decomposition when under microbial attack. Microbial degradation of lecithin destroys the structure of the compound, and eliminates its protective corrosion inhibition capability in the steam condensate. Lecithin-based products, therefore, require preservation or they will not survive even short-term storage prior to use.

The application of a corrosion inhibitor to the steam condensate of a boiler servicing a food or beverage operation requires that the inhibitor, and all components of the inhibitor formulation, have approvals for that use by the U.S. Food and Drug Administration (FDA). A lecithin-based inhibitor, being a natural product, meets the FDA standards.

In most steam condensate operations (non-FDA), the application of preservatives to a corrosion inhibitor used to treat the condensate is unnecessary or easily accomplished with commercially available preservatives. This is not the case with a lecithin-based inhibitor that is adapted for usage in boiler systems that must comply with FDA regulations. The possibility of food contact requires that all of the inhibitor formulation components be FDA acceptable. The likely rapid biodegradation of the lecithin-based inhibitor during storage dictates that the inhibitor itself must be preserved, and the FDA requirement that all components of a product formulation carry FDA approval further dictates that the corrosion inhibitor must be preserved by a compound with FDA clearance for direct food contact.

In the development of the inhibitor, many known compounds (all FDA cleared) were evaluated as preservatives for lecithin. Among those tested were sorbates, benzoates, lactoferrin, sulfites, BHT, polysorbates, quaternary ammonium salts, isothiazolins, propionates, and other FDA approved preservatives. All of these were rejected because they were ineffective as preservatives in this application, destabilized the lecithin dispersion, or hindered the corrosion inhibition of the lecithin component.

DETAILED DESCRIPTION

We found that bronopol i.e., 2-bromo-2-nitropropane-1,3 diol (BNPD) serves as an effective preservative for lecithin without interfering with the desired corrosion inhibition function of the lecithin when used in steam condensate systems. To our knowledge, this compound has never been used as a preservative for a steam condensate corrosion inhibitor. Also, to our knowledge, BNPD has never been used to preserve any products that may come into direct contact with foods or beverages.

Aqueous solutions comprising lecithin and 2-bromo-2-nitropropane-1,3 diol (Bronopol) are fed to the steam condensate system being treated by conventional liquid feeding means or they may be fed to the boiler feedwater or directly to the steam supply lines steam traps, return lines, etc. Aqueous solutions of the steam condensate corrosion inhibitor comprise: water soluble and dispersible combinations of lecithin and Bronopol in an aqueous medium. The molar ratio of lecithin to Bronopol present in such compositions may be on the order of about 40-10:1 (lecithin to Bronopol) with a more preferred ratio of about 15-5:1 lecithin:Bronopol. Based on preliminary observations, a ratio of about 13.3:1 is presently preferred.

The aqueous compositions may be fed to the steam condensate systems in amounts of about 0.1-1000 ppm and preferably about 1-500, most preferably 1-100 ppm (based on active ingredients present).

As mentioned above, the Bronopol serves to inhibit formation of microbial organisms in aqueous lecithin compositions. The aqueous compositions containing Bronopol and lecithin may then be used to inhibit corrosion of metallurgical surfaces in contact with boiler systems in general and preferably are used in the steam condensate portions of these systems.

Table 1 attached includes data generated during the testing of BNPD and lecithin in regard to preservation of lecithin. This data indicates that BNPD is effective in preserving lecithin when used in concentrations greater than about 0.075% (>750 ppm).

2. ACETIC ACID—FDA GRAS; FEMA GRAS; found in banana, beer, beef, apple juice, apricot, blue cheese, blueberries; used in condiment relishes.
3. ACETOIN—FDA GRAS; FEMA GRAS; found in apples, butter, yogurt, asparagus, black currants, blackberry, wheat, broccoli, brussels sprouts, cantaloupe; used in baked goods.
4. ACETOPHENONE—FDA approved food additive; FEMA GRAS; found in apple, cheese, apricot, banana, beef, cauliflower; used in chewing gum.
5. 6-ACETOXYDIHYDROTHEASPIRANE—FEMA GRAS; used in baked goods, instant coffee/tea, snacks, soups, seasonings, meat products.
6. 2-ACETYL-3-ETHYLPYRAZINE—FEMA GRAS; found in pork; used in soups.
7. 2-ACETYL-5-METHYLFURAN—FEMA GRAS; found in coffee, roasted filbert, tomato juice; used in soups, nut products, snack foods, gravies.

| | Bronopol Preservation of Lecithin Samples | | | | | | | | | | | |
|---|---|---|---|---|---|---|---|---|---|---|---|---|
| | Bronopol concentration | PEG concentration | | | | | Microbial Count in cfu/ml Date | | | | | |
| Sample | ppm | ppm | D-1 | D-3 | D-6 | D-9 | D-13 | D-16 | D-20 | D-23 | D-28 | D-30 |
| 8 | 250 | 0 | 0 | 0 | 0 | 5.30E+02 | 2.70E+05 | 2.20E+06 | 6.40E+05 | 5.00E+06 | 5.50E+06 | 1.20E+07 |
| 5 | 250 | 0 | 0 | 0 | 0 | 8.10E+02 | 5.60E+05 | 7.70E+05 | 1.50E+04 | 2.70E+06 | 8.80E+06 | 8.00E+06 |
| 3 | 250 | 1.00% | 0 | 0 | 0 | 0 | 0 | 0 | 0 | 0 | 0 | 0 |
| 4 | 250 | 1.00% | 0 | 0 | 0 | 0 | 10 | 58 | 1.00E+03 | 8.40E+02 | 2.00E+03 | 2.20E+03 |
| 9 | 500 | 0 | 0 | 0 | 0 | 0 | 0 | 0 | 0.00E+00 | 0.00E+00 | 0.00E+00 | 0.00E+00 |
| 7 | 500 | 0.50% | 0 | 0 | 0 | 88 | 470 | 640 | 750 | 370 | 380 | 640 |
| 2 | 750 | 0 | 0 | 0 | 0 | 0 | 0 | 0 | 0 | 0 | 0 | 0 |
| 10 | 750 | 0 | 0 | 0 | 0 | 0 | 0 | 0 | 0 | 0 | 0 | 0 |
| 1 | 750 | 1.00% | 0 | 0 | 0 | 0 | 0 | 0 | 0 | 0 | 0 | 0 |
| 6 | 750 | 1.00% | 0 | 0 | 0 | 0 | 0 | 0 | 0 | 0 | 0 | 0 |
| 12 | 1000 | 0.50% | 0 | 0 | 0 | 0 | 0 | 0 | 0 | 0 | 0 | 0 |
| 11 | 1000 | 1.00% | 0 | 0 | 0 | 0 | 0 | 0 | 0 | 0 | 0 | 0 |

D-1-D-30 signify testing days in chronological order: D-1 = day one; D-3 = day three, etc.
All of the test solutions included 4.0% lecithin.
E = exponent   $5.30E+02 = 5.3 \times 10^2$, etc.

In addition to use as a corrosion inhibitor in steam generating systems, lecithin may be used for a variety of other purposes. For example, it can be used as an emulsifying agent in food production such as for mayonnaise, ice cream, chocolate, etc. It can also be used as an emulsifying agent in cosmetic formulations. Other possible end uses include use as an antioxidant in textile, rubber and fats applications, as a dietary supplement and as an animal feed additive. Additionally, lecithin may be used as a dispersing agent for paint and ink production, as a release agent for plastics and in antisludge formulations for motor lubricants and as an antigumming agent in gasoline.

In all of these potential end use applications for lecithin and in others not listed above, it is desirable to preserve the lecithin with BNPD in the molar ratio ranges above stated so that the lecithin will not readily deteriorate in storage and shipping and will be available to perform its intended function.

In yet another aspect of the invention, BNPD serves as an effective preservative for those additives that are generally regarded as safe (GRAS) by the U.S. Government. These additives are listed herein:

1. ACETANISOLE—FDA approved food additive; FEMA GRAS; found in beef, cranberry, guava, grape, mango, peppermint; used in frozen dairy products, hard candies.

8. ACETYLPYRAZINE—FEMA GRAS; found in beef, coffee, popcorn, sesame seed, almond, wheat bread, cocoa, peanut, pork, potato chips; used in frozen dairy products.
9. 2-ACETYLPYRIDINE—FEMA GRAS; found in cocoa, coffee, roasted peanut, potato chips, tea, beer, wheat bread, hazelnut, lamb/mutton, potato; used in breakfast cereals, ice cream, candy.
10. 3-ACETYLPYRIDINE—FEMA GRAS; found in roasted filbert, cocoa; used in non-alcoholic beverages, ice cream, candy, gelatin and puddings, baked goods.
11. 2-ACETYLTHIAZOLE—FEMA GRAS; found in bean, potatoes, artichoke, asparagus, beef, beer, brazil nuts, rice, boiled shrimp; used in snack foods.
12. ACONITIC ACID—FDA GRAS; FEMA GRAS; found in beet root, sugarcane; used in alcoholic beverages, baked goods, chewing gum.
13. dl-ALANINE—FDA approved food additive; natural constituent of protein in plants and animals; found in apple, beef, carob, pea, soybean, wine, zucchini.
14. ALFALFA EXTRACT—FDA GRAS; FEMA GRAS; found in alfalfa; used in baked goods.
15. ALLSPICE EXTRACT, OLEORESIN, AND OIL—FDA GRAS; FEMA GRAS; used in soups, candies, chewing gum, meats.

16. ALLYL HEXANOATE—FDA approved food additive; FEMA GRAS; found in baked potato; used in gelatin and puddings.
17. ALLYL IONONE—FDA approved food additive; FEMA GRAS; used in ice cream, baked goods, candy, gelatin and puddings, jellies.
18. ALMOND BITTER OIL—FDA GRAS; FEMA GRAS; found in almond, apricot, peach kernel; used in baked goods, candy, gelatin and puddings, chewing gum.
19. AMBERGRIS TINCTURE—FDA GRAS; FEMA GRAS; used in non-alcoholic beverages, ice cream, candy.
20. AMMONIA—Occurs in human/animal breath due to protein metabolism; dissolved in water it is a naturally occurring substance that plays a vital role in protein metabolism in animals, including man.
21. AMMONIUM BICARBONATE—FDA GRAS; used in baked goods.
22. AMMONIUM HYDROXIDE—FDA GRAS; found in cured pork.
23. AMMONIUM PHOSPHATE DIBASIC—FDA GRAS; used in dough, ice cream, gelatin and puddings.
24. AMMONIUM SULFIDE—FEMA GRAS; used in baked goods, meat products, gravies, condiments.
25. AMYL ALCOHOL—FDA approved food additive; FEMA GRAS; found in apple, banana, cheese, chicken, coffee, potato, raspberry, strawberry, tomato; used in baked goods, candy, gelatin and puddings, chewing gum.
26. AMYL BUTYRATE—FDA approved food additive; FEMA GRAS; found in bananas, beer, apple juice, apricots, strawberries, wine; used in syrup, candy, chewing gum.
27. AMYL FORMATE—FDA approved food additive; FEMA GRAS; found in apples, strawberry, brandy, honey, tomatoes, whiskey; used in non-alcoholic beverages, candy, chewing gum.
28. AMYL OCTANOATE—FDA approved food additive; FEMA GRAS; found in strawberry, apple, cognac; used in baked goods, candy, gelatin and puddings.
29. alpha-AMYLCINNAMALDEHYDE—FDA approved food additive; FEMA GRAS; found in black tea, olibanum; used in candy, baked goods, chewing gum.
30. AMYRIS OIL—FDA approved food additive; found in brandies, liqueurs, amryis balsamifera; used in brandies, liqueurs, oriental specialties.
31. trans-ANETHOLE—FDA GRAS; FEMA GRAS; found in cheese, tea, apple, licorice; used in alcoholic beverages.
32. ANGELICA ROOT EXTRACT, OIL AND SEED OIL—FDA GRAS; FEMA GRAS; used in non-alcoholic beverages, alcoholic beverages, baked goods, chewing gum.
33. ANISE, ANISE STAR, EXTRACT AND OILS—FDA GRAS; FEMA GRAS; found in star anise; used in ice cream, ices, baked goods, candy, chewing gum, meats, condiments.
34. ANISYL ACETATE—FDA approved food additive; FEMA GRAS; found in currant; used in baked goods, candy, gelatin and puddings, chewing gum.
35. ANISYL ALCOHOL—FDA approved food additive; FEMA GRAS; found in honey, tomato; used in gelatin and puddings.
36. ANISYL FORMATE—FDA approved food additive; FEMA GRAS; found in vanilla; used in candy, baked goods.
37. ANISYL PHENYLACETATE—FDA approved food additive; FEMA GRAS; found in honey; used in baked goods.
38. APPLE JUICE CONCENTRATE, EXTRACT, AND SKINS—common food item found in apple; used in juices, baked goods.
39. APRICOT EXTRACT AND JUICE CONCENTRATE—Common food item found in apricot; used in condiments.
40. 1-ARGININE—FDA approved food additive; natural constituent of proteins in plants and animals.
41. ASAFETIDA FLUID EXTRACT AND OIL—FDA GRAS; FEMA GRAS; used in condiments, candy, soups, meats.
42. ASCORBIC ACID—FDA GRAS; FEMA GRAS; found in citrus fruit, tea leaves; used in baked goods, sweet sauce, soups, candy, gelatin and puddings, dairy products.
43. 1-ASPARAGINE MONOHYDRATE—FDA approved food additive; found in proteins, licorice.
44. 1-ASPARTIC ACID—FDA approved food additive; FEMA GRAS; found in proteins, licorice; used in seasonings.
45. BALSAM PERU AND OIL—FDA GRAS; FEMA GRAS; found in Peru balsam; used in baked goods, syrups, candy, chewing gum.
46. BASIL OIL—FDA GRAS; FEMA GRAS; found in basil; used in baked goods, condiments, meats.
47. BAY LEAF, OIL AND SWEET OIL—FDA GRAS; FEMA GRAS; found in bay leaves; used in condiments, meat.
48. BEESWAX WHITE—FDA GRAS; FEMA GRAS; used in baked goods, candy, honey.
49. BEET JUICE CONCENTRATE—Beets are included among "Miscellaneous Vegetables" in FDA Standards of Identity and are also covered by a USDA Standards for Grades.
50. BENZALDEHYDE—FDA GRAS; FEMA GRAS; found in apple juice, almond, apricot, artichoke, asparagus, beans, beef, beer; used in baked goods, chewing gum.
51. BENZALDEHYDE GLYCERYL ACETAL—FDA approved food additive; FEMA GRAS; used in baked goods, candy, gelatin and puddings, chewing gum.
52. BENZOIC ACID—FDA GRAS; FEMA GRAS; found in cinnamon, strawberry, tea, apple, beer, bread, cocoa, honey; used in baked goods, cheese, candy, chewing gum, condiment relish.
53. BENZOIN—FDA approved food additive; FEMA GRAS; used in non-alcoholic beverages, alcoholic beverages, baked goods, candy, chewing gum.
54. BENZOIN RESIN—FDA approved food additive; FEMA GRAS; used in baked goods, gelatin and puddings, chewing gum.
55. BENZOPHENONE—FDA approved food additive; FEMA GRAS; found in grape, apples, papaya; used in frozen dairy products.
56. BENZYL ALCOHOL—FDA approved food additive; FEMA GRAS; found in apricot, beef, beer, almonds, apple, apple juice, asparagus, bananas, black currants, blackberries; used in chewing gum, candy, baked goods.
57. BENZYL BENZOATE—FDA approved food additive; FEMA GRAS; found in celery, parsley, black currants, butter, guava, pineapple, papaya; used in ice cream, baked goods, candy.
58. BENZYL BUTYRATE—FDA approved food additive; FEMA GRAS; found in apple, apple juice, apricot, banana, parmesan cheese, grape, honey, mango, melon, muskmelon, orange juice, papaya; used in candy.
59. BENZYL CINNAMATE—FDA approved food additive; FEMA GRAS; used in non-alcoholic beverages, baked goods, candy.

60. BENZYL PROPIONATE—FDA approved food additive; FEMA GRAS; found in strawberry; used in candy.
61. BENZYL SALICYLATE—FDA approved food additive; FEMA GRAS; found in cranberry, apple flowers; used in baked goods.
62. BERGAMOT OIL—FDA GRAS; FEMA GRAS; found in oranges; used in icings, gelatin, alcoholic beverages.
63. BISABOLENE—FEMA GRAS; found in carrot, ginger, hops, guava, mango, ginger; used in baked goods, candy.
64. BLACK CURRANT BUDS ABSOLUTE—FDA approved food additive; FEMA GRAS; used in non-alcoholic beverages, baked goods, candy, gelatin and puddings.
65. BORNEOL—FDA approved food additive; FEMA GRAS; found in carrot, blackberries, brandy, grapes, cocoa; used in baked goods.
66. BORNYL ACETATE—FDA approved food additive; FEMA GRAS; found in carrot, black currants, gin, ginger, kiwi fruit, pistacia, plum, sweet potato, soy sauce, black and green tea; used in gelatin and puddings, candy, ice cream.
67. BUCHU LEAF OIL—FDA approved food additive; FEMA GRAS; used in ice cream, ices, candy, condiments.
68. 1,3-BUTANEDIOL—FDA approved food additive; used as solvent for natural and synthetic flavors.
69. 2,3-BUTANEDIONE—FDA GRAS; FEMA GRAS; found in apple, bean, beef, butter, artichoke, avocado, black currants, blueberry, blue cheese, grape brandy, wheat, brussels sprouts; used in meat products.
70. 1-BUTANOL—FDA approved food additive; FEMA GRAS; found in apple juice, banana, beef, celery, cheese (cheddar and Swiss), peach, potato; used in non-alcoholic beverages, alcoholic beverages, ice cream, ices, candy, cream, baked goods.
71. 2-BUTANONE—FDA approved food additive; FEMA GRAS; found in apple, apricot, banana, cauliflower, celery, chicken, coffee, milk, onion, tomato; used in non-alcoholic beverages, ice cream, ices, candy, baked goods.
72. 4(2-BUTENYLIDENE)-3,5,5-TRIMETHYL-2-CYCLOHEXEN-1-ONE—found in white-flesh nectarine, starfruit, grapefruit juice.
73. BUTTER, BUTTER ESTERS, AND BUTTER OIL—FDA approved food additive; FEMA GRAS; found in butter; used in frozen dairy products.
74. BUTYL ACETATE—FDA approved food additive; FEMA GRAS; found in apple, banana, beer, black currant, cashew nuts, cheese, raspberry, apricot, blackberry, brandy, cantaloupe; used in cheeses, baked goods, candy.
75. BUTYL BUTYRATE—FDA approved food additive; FEMA GRAS; found in banana, apricot, blackberry, brandy, parmesan cheese, honey, mango, melon, muskmelon, orange juice, papaya; used in candy.
76. BUTYL BUTYRYL LACTATE—FDA approved food additive; FEMA GRAS; used in non-alcoholic beverages, baked goods, candy, sweet sauces.
77. BUTYL ISOVALERATE—FDA approved food additive; FEMA GRAS; found in apple, apricot, banana, parmesan cheese, olives, pear, plum, strawberry, wine; used in baked goods.
78. BUTYL PHENYLACETATE—FDA approved food additive; FEMA GRAS; found in papaya, alfalfa; used in baked goods, ice cream, candy.
79. BUTYL UNDECYLENATE—FDA approved food additive; FEMA GRAS; no limitation for use in food other than good manufacturing practices.
80. 3-BUTYLIDENEPHTHALIDE—FEMA GRAS; found in celery, celery stalk; used in soups, condiments, meats.
81. BUTYRIC ACID—FDA GRAS; FEMA GRAS; found in apple, beef, beer, black currants, blueberries, wheat bread, butter, blue cheese; used in snack foods, candy, margarine.
82. CADINENE—FDA approved food additive; found in grapefruit, orange juice, peach, pepper, peppermint, tea; used in baked goods, candy, gelatin and puddings, meat products.
83. CAFFEINE—FDA GRAS; FEMA GRAS; found in coffee, tea, mate, kola nut; used in non-alcoholic beverages, ice cream, ices, baked goods, candy, gelatin and puddings.
84. CALCIUM CARBONATE—FDA GRAS; no limitation for use in food other than good manufacturing practices. Used as a dietary supplement; also used in baked goods, chewing gum, beverages.
85. CAMPHENE—FDA approved food additive; FEMA GRAS; found in carrot, cheddar cheese, ginger, apricot, black currants, blackberry, celery, gin, kiwi fruit; used in candy, baked goods, ice cream.
86. CANANGA OIL—FDA GRAS; FEMA GRAS; used in non-alcoholic beverages, candy, baked goods.
87. CAPSICUM OLEORESIN—found in pepper; used in non-alcoholic beverages, baked goods, condiments, candy, chewing gum, meats.
88. CARAMEL COLOR—FDA GRAS; FEMA GRAS; found in sugars; used in gravies, meats, condiments.
89. CARAWAY OIL—FDA GRAS; FEMA GRAS; found in caraway seeds; used in baked goods, condiments.
90. CARBON DIOXIDE—FDA GRAS; used in beverages, meat products, processed fruits, dairy products.
91. CARDAMOM OLEORESIN, EXTRACT, SEED OIL, AND POWDER—FDA GRAS; FEMA GRAS; found in cardamom; used in baked goods, pickles, meats.
92. CAROB BEAN AND EXTRACT—FDA GRAS; FEMA GRAS; found in carob beans; used in baked goods, candy, gelatin and puddings, icings and toppings.
93. beta-CAROTENE—FDA GRAS; found in carrot, pumpkin, spinach, broccoli, used in processed fruit and fruit juices, dairy products.
94. CARROT OIL—FDA GRAS; FEMA GRAS; found in carrots; used in baked goods.
95. CARVACROL—FDA approved food additive; FEMA GRAS; found in pepper, spearmint, tea; used in baked goods, condiments, candy, gelatin and puddings, chewing gum.
96. 4-CARVOMENTHENOL—FDA approved food additive; FEMA GRAS; found in carrot, celery seed, cocoa powder, grape, grapefruit, orange, tea, wine; used in non-alcoholic beverages, candy, baked goods, gelatin and puddings, chewing gum.
97. 1-CARVONE—FDA GRAS; FEMA GRAS; found in grapefruit juice, honey, hops oil, orange juice, beer, cherries, endive, guava, hazelnuts; used in candy, condiments, baked goods.
98. beta-CARYOPHYLLENE—FDA approved food additive; FEMA GRAS; found in carrot, artichoke, banana, cashews, apples, celery, chervil, chicken, cocoa; used in chewing gum, ice cream, beverages.
99. beta-CARYOPHYLLENE OXIDE—FDA approved food additive; found in rosemary; used in beverages, ice cream, candy, condiments.
100. CASCARILLA OIL AND BARK EXTRACT—FDA GRAS; FEMA GRAS; used in baked goods, candy, condiments.
101. CASSIA BARK OIL—FDA GRAS; FEMA GRAS; found in cassia; used in meat products.

102. CASSIE ABSOLUTE AND OIL—FDA approved food additive; FEMA GRAS; found in cassie; used in candy, baked goods, ice cream.
103. CASTOREUM EXTRACT, TINCTURE AND ABSOLUTE—FDA GRAS; FEMA GRAS; found in castor; used in baked goods, condiments, candy, chewing gum.
104. CEDAR LEAF OIL—FDA approved food additive; FEMA GRAS; found in cedar tree; used in alcoholic beverages, meats, candy.
105. CEDARWOOD OIL TERPENES AND VIRGINIANA—FDA approved food additive; found in cedarwood, clary sage oil.
106. CEDROL—FDA approved food additive; found in cypress wood, cedar wood; used in alcoholic beverages, meat products.
107. CELERY SEED EXTRACT, SOLID, OIL, AND OLEORESIN—FDA GRAS; FEMA GRAS; found in celery seeds, celery; used in baked goods, meats, soups, condiments, pickles.
108. CELLULOSE FIBER—Natural polysaccharide which is the most abundant carbohydrate in nature; found in all plant material; used in grated cheese, fruit preserves/jams, fruit jellies.
109. CHAMOMILE FLOWER OIL AND EXTRACT—FDA GRAS; FEMA GRAS; found in chamomile flowers; used in non-alcoholic beverages, ice cream, baked goods, gelatins and puddings.
110. CHICORY EXTRACT—FDA GRAS; FEMA GRAS; found in chicory; used in baked goods, non-alcoholic beverages, ice cream.
111. CHOCOLATE—FDA GRAS; common food item.
112. CINNAMALDEHYDE—FDA GRAS; FEMA GRAS; found in beer, brandy, blueberries, cantaloupe, capers, cranberries, gin, guava, melon; used in gravies, candy, ice cream, meat.
113. CINNAMIC ACID—FDA approved food additive; FEMA GRAS; found in beer, blackberry, capers, cherry, grape, guava, malt, mango, mushroom, passion fruit, strawberry; used in soft candy.
114. CINNAMON LEAF OIL, BARK OIL, AND EXTRACT—FDA GRAS; FEMA GRAS; found in cinnamon tree; used in baked goods, chewing gum, candy, meats, condiments, pickles.
115. CINNAMYL ACETATE—FDA approved food additive; FEMA GRAS; found in guava; used in candy, ice cream, condiments.
116. CINNAMYL ALCOHOL—FDA approved food additive; FEMA GRAS; found in blackberry, blueberry, cantaloupe, cranberry, guava, melon, raspberry, strawberry, watermelon; used in non-alcoholic beverages.
117. CINNAMYL CINNAMATE—FDA approved food additive, FEMA GRAS; found in storax; used in baked goods, ice cream, candy.
118. CINNAMYL ISOVALERATE—FDA approved food additive; FEMA GRAS; found in chestnut flowers; used in candy, gelatin and puddings, chewing gum.
119. CINNAMYL PROPIONATE—FDA approved food additive; FEMA GRAS; used in hard candy.
120. CITRAL—FDA GRAS; FEMA GRAS; found in grapefruit juice, orange, orange juice, celery, apricot, black currants, grape, hops, kiwi fruit, mango, mango ginger, melon, plum, raspberry, rum; used in baked goods, candy, ice cream.
121. CITRIC ACID—FDA GRAS; FEMA GRAS; widely found in fruits and vegetables; used in fruit juices, meats, poultry, beverages.
122. CITRONELLA OIL—FDA GRAS; FEMA GRAS; found in citronella; used in alcoholic beverages, ice cream, baked goods.
123. d1-CITRONELLOL—FDA approved food additive; FEMA GRAS; found in apple, apricot, beer, black currants, blackberry, blueberry, orange juice, passion fruit, peach; used in soft candy.
124. CITRONELLYL BUTYRATE—FEMA GRAS; found in passion fruit, tomato; used in baked goods, candy, gelatins, puddings, non-alcoholic beverages.
125. CITRONELLYL ISOBUTYRATE—FDA approved food additive; FEMA GRAS; used in candy, gelatins and puddings, non-alcoholic beverages, baked goods.
126. CIVET ABSOLUTE—FDA GRAS; FEMA GRAS; found in civet; used in ice cream, candy, baked goods, chewing gum.
127. CLARY OIL—FDA GRAS; FEMA GRAS; found in clary sage; used in alcoholic beverages, baked goods, condiments.
128. CLOVER TOPS, RED SOLID EXTRACT—FDA GRAS; FEMA GRAS; found in clover flowers; used in jam and jelly.
129. COCOA, COCOA SHELLS, EXTRACT, DISTILLATE AND POWDER—FDA GRAS; found in cocoa, cocoa shells; used in baked goods.
130. COCONUT OIL—found in coconut; used in shortening and candies, chocolate.
131. COFFEE—FDA GRAS; found in coffee; used in baked goods, candy, syrups.
132. COGNAC WHITE AND GREEN OIL—FDA GRAS; FEMA GRAS; found in cognac brandy; used in alcoholic beverages, ice cream, baked goods.
133. COPAIBA OIL—FDA approved food additive; found in copaiba.
134. CORIANDER EXTRACT AND OIL—FDA GRAS; FEMA GRAS; found in coriandar; used in baked goods, meats, condiments.
135. CORN OIL—found in corn; used in baked goods, margarine, salad oils.
136. CORN SILK—FDA GRAS; FEMA GRAS; found in corn; used in baked goods, beverages, candy, desserts.
137. COSTUS ROOT OIL—FDA approved food additive; FEMA GRAS; found in Costus root; used in candy, baked goods.
138. CUBEB OIL—FDA approved food additive; FEMA GRAS; found in Piper cubebs; used in condiment relish.
139. CUMINALDEHYDE—FDA approved food additive; FEMA GRAS; found in beef, black currants, honey, mango, bonito, grape brandy, pistacia fruit; used in baked goods, chewing gum, frozen dairy products.
140. para-CYMENE—FDA approved food additive; FEMA GRAS; found in apricot, banana, beans, beli, black currants, brandy apple, carrots, celery; used in chewing gum.
141. 1-CYSTEINE—FDA GRAS; FEMA GRAS; natural constituent of protein in plants and animals; found in Pippali fruit (India); used in condiment relish; beverages, meats, baked goods, dairy products.
142. DANDELION ROOT SOLID EXTRACT—FDA GRAS; FEMA GRAS; found in dandelions; used in baked goods.
143. DAVANA OIL—FDA approved food additive; FEMA GRAS; found in *Artemisia* plant; used in alcoholic beverages.
144. 2-trans,4-trans-DECADIENAL—FDA approved food additive; FEMA GRAS; found in chicken, cranberry, peanut, tomato; used in vegetables, baked goods, meat, candy, chewing gum, cereals.

145. delta-DECALACTONE—FDA approved food additive; FEMA GRAS; found in apricot, beef fat, butter, black currants, blackberry, blue cheese, cheddar cheese, chicken, coconut, cranberry, cream; used in baked goods, margarine, candy.
146. gamma-DECALACTONE—FDA approved food additive; FEMA GRAS; found in apricot, beef, butter, beer, blue cheese, grape brandy, plum brandy, wheat bread, cantaloupe, cheese; used in baked goods, frozen dairy products.
147. DECANAL—FDA GRAS; FEMA GRAS; found in almond, apple, apple flowers, apricot, artichoke, avocado, beef, wheat bread; used in baked goods, beverages, ice cream, candy.
148. DECANOIC ACID—FDA approved food additive; FEMA GRAS; found in apple, apple flowers, banana, beef, beer, blackberries, blue cheese, brandies, wheat bread, butter, heated butter; used in imitation dairy goods.
149. 1-DECANOL—FDA approved food additive; FEMA GRAS; found in apple, apple juice, apricot, asparagus, banana, beer, brandy apple, butter; used in frozen dairy goods, ice cream, beverages, candy.
150. 2-DECENAL—FDA approved food additive; FEMA GRAS; found in carrot root, chicken, orange, soybean; used in non-alcoholic beverages, alcoholic beverages, baked goods, candy, gelatin and puddings, dairy products.
151. DEHYDROMENTHOFUROLACTONE—FEMA GRAS; used in chewing gum.
152. DIETHYL MALONATE—FDA approved food additive; FEMA GRAS; found in whiskey, wine, blackberry, grape brandy, strawberry wine.
153. DIETHYL SEBACATE—FDA approved food additive; FEMA GRAS; used in chewing gum, candy, baked goods.
154. 2,3-DIETHYLPYRAZINE—FEMA GRAS; found in wheat bread, wheat, hazelnut, baked potato, soy sauce; used in candy, gelatin and puddings.
155. DIHYDRO ANETHOLE—FEMA GRAS; used in non-alcoholic beverages, alcoholic beverages, ice cream, ices, candy, dairy products, baked goods.
156. 5,7-DIHYDRO-2-METHYLTHIENO(3,4-D)PYRIMIDINE—FEMA GRAS; used in breakfast cereals, beverages, ice cream, candy, dairy products.
157. DILL SEED OIL AND EXTRACT—FDA GRAS; FEMA GRAS; found in dill; used in cheese, meats, sauces, dips, baked goods.
158. meta-DIMETHOXYBENZENE—FDA approved food additive; FEMA GRAS; found in brandy grape, salami, filberts; used in meat products, beverages, ice cream, candy, baked goods.
159. para-DIMETHOXYBENZENE—FDA approved food additive; FEMA GRAS; found in tea, hyacinth oil, peppermint oil; used in gelatin pudding, beverages, ice cream, candy, baked goods.
160. 2,6-DIMETHOXYPHENOL—FEMA GRAS; found in maple syrup, rum, smoked sausage, wine; used in seafood, meat, baked goods, candy, soups.
161. DIMETHYL SUCCINATE—FDA approved food additive; FEMA GRAS; found in blackberry, hazelnut; used in hard candy, beverages, ice cream, candy, baked goods.
162. 3,4-DIMETHYL-1,2-CYCLOPENTANEDIONE—FEMA GRAS; found in roasted coffee; used in nut products, beverages, ice cream, candy.
163. 3,5-DIMETHYL-1,2-CYCLOPENTANEDIONE—FEMA GRAS; found in roasted coffee; used in soft candy.
164. 3,7-DIMETHYL-1,3,6-OCTATRIENE—FDA approved food additive; FEMA GRAS; found in apricot, guava, pineapple, tomato; used in frozen dairy goods.
165. 4,5-DIMETHYL-3-HYDROXY-2,5-DIHYDROFURAN-2-ONE—FEMA GRAS; found in almond, asparagus, wheat bread, butter, chicken, steamed clam, cocoa, coconut, coffee, corn; used in baked goods, sweet sauce.
166. 6,10-DIMETHYL-5,9-UNDECADIEN-2-ONE—FDA approved food additive; FEMA GRAS; found in almond, asparagus, beans, beef, beer, cashew nuts, parmesan cheese, chicken; used in baked goods, candy, dairy products.
167. 3,7-DIMETHYL-6-OCTENOIC ACID—FEMA GRAS; found in peppermint oil; used in baked goods.
168. 2,4-DIMETHYLACETOPHENONE—FDA approved food additive; FEMA GRAS; found in coffee; used in baked goods.
169. alpha,para-DIMETHYLBENZYL ALCOHOL—FEMA GRAS; used in non-alcoholic beverages, ice cream, ices, candy.
170. alpha,alpha-DIMETHYLPHENETHYL ACETATE—FDA approved food additive; FEMA GRAS; found in apricots, black currants, custard apple, grapefruit, pineapples, peppermint, nectarines; used in soft candy, baked goods, chewing gum.
171. alpha,alpha-DIMETHYLPHENETHYL BUTYRATE—FDA approved food additive; FEMA GRAS; found in sake; used in frozen dairy goods, beverages, candy, baked goods.
172. 2,3-DIMETHYLPYRAZINE—FEMA GRAS; found in asparagus, peanut, coffee, potato; used in gravies, beverages, candy, baked goods.
173. 2,5-DIMETHYLPYRAZINE—FEMA GRAS; found in beef, blackberry, grape brandy, cantaloupe, corn, endive, grapefruit juice; used in breakfast cereal.
174. 2,6-DIMETHYLPYRAZINE—FEMA GRAS; found in citronella, camphor oil; used in milk products, meat, candy.
175. DIMETHYLTETRAHYDROBENZOFURANONE—FEMA GRAS; found in dried bonito, black and green tea, wine; used in chewing gum.
176. delta-DODECALACTONE—FDA approved food additive; FEMA GRAS; found in beef, butter, milk, blue cheese, cheddar cheese, chicken, coconut, lamb/mutton, peach, plum, pork; used in meat products, baked goods, candy.
177. gamma-DODECALACTONE—FDA approved food additive; FEMA GRAS; found in apricot, beef, beer, blackberry, blue cheese, butter, carambola (starfruit), cheddar cheese, chervil, chicken; used in b0aked goods, beverages, ice cream, candy.
178. para-ETHOXYBENZALDEHYDE—FDA approved food additive; FEMA GRAS; used in baked goods, beverages, ice cream, candy.
179. ETHYL 10-UNDECENOATE—FDA approved food additive; FEMA GRAS; used in baked goods, beverages, ice cream, candy.
180. ETHYL 2-METHYLBUTYRATE—FDA approved food additive; FEMA GRAS; found in apple, apple juice, beer, bilberry, blackberry, brandy apple, brandy grape, cantaloupe, fig, grape, honeydew melon; used in hard candy, beverages, ice cream.
181. ETHYL ACETATE—FDA GRAS; FEMA GRAS; found in apple, apple juice, banana, beans, beef, beer, blue cheese, blueberry; used in chewing gum, beverages, ice cream, candy.
182. ETHYL ACETOACETATE—FDA approved food additive; FEMA GRAS; found in passion fruit, sherry, strawberry, wine; used in soft candy.
183. ETHYL ALCOHOL—FDA GRAS; FEMA GRAS; found in apple, banana, bread, coffee, cucumber, potato. As required by BATF regulations, nicotine sulfate is used to denature the alcohol, which is used as a solvent to apply flavors during processing. There is no measurable effect on the nicotine level of the finished cigarette as a result of this process.

184. ETHYL BENZOATE—FDA approved food additive; FEMA GRAS; found in apple, apricot, arctic bramble, babaco fruit, banana, beer, beli, bilberry, bilberry wine, black currants, blackberry, brandy apple; used in gelatin pudding, beverages, ice cream, candy.

185. ETHYL BUTYRATE—FDA GRAS; FEMA GRAS; found in apple, apple juice, banana, beer, apricot, beef, blue cheese, brandy; used in chewing gum.

186. ETHYL CINNAMATE—FDA approved food additive; FEMA GRAS; found in beer, blackberry, brandy apple; used in baked goods, beverages, ice cream, candy.

187. ETHYL DECANOATE—FDA approved food additive; FEMA GRAS; found in apple juice, banana, beef, wheat bread, butter, cheddar cheese; used in frozen dairy goods, ice cream, candy.

188. ETHYL FENCHOL—FEMA GRAS; used in baked goods, chewing gum, dairy products.

189. ETHYL FUROATE—found in cocoa, almonds, beer, guava, kiwi fruit, papaya, white wine; used in processed meats.

190. ETHYL HEPTANOATE—FDA approved food additive; FEMA GRAS; found in cashew apple, cocoa, grape, grapefruit juice, hazelnut roasted, hops, milk, olive, papaya mountain, passion fruit, peach; used in chewing gum.

191. ETHYL HEXANOATE—FDA approved food additive; FEMA GRAS; found in banana, beer, cheese, beef, black currants, blackberry, brandies, broccoli; used in baked goods, ice cream, candy.

192. ETHYL ISOVALERATE—FDA approved food additive; FEMA GRAS; found in banana, celery, apple, beer, brandy, cantaloupes, cashew apple, parmesan cheese; used in condiments, ice cream, baked goods.

193. ETHYL LACTATE—FDA approved food additive; FEMA GRAS; found in apple, beer, cocoa, pineapple, apricot, bilberry wine, brandy, butter, capers, chicken, meat, elderberry, elderberry juice, grape, peas, plum; used in chewing gum, ice cream, baked goods.

194. ETHYL LAURATE—FDA approved food additive; FEMA GRAS; found in apple, beer, cheddar cheese, apricot, bilberry wine, blackberry, brandy, wheat bread, butter; used in baked goods, candy, ice cream.

195. ETHYL LEVULINATE—FDA approved food additive; FEMA GRAS; found in bilberry wine, brandy grape, wheat bread, cherimoya, cocoa, onion roasted, rum, wine; used in frozen dairy goods, beverages, candy, baked goods.

196. ETHYL MALTOL—FDA approved food additive; FEMA GRAS; found in apple juice; used in sweet sauce, soups, meat, candy.

197. ETHYL METHYL PHENYLGLYCIDATE—FDA GRAS; FEMA GRAS; used in condiment relish, beverages, candy, ice cream.

198. ETHYL MYRISTATE—FDA approved food additive; FEMA GRAS; found in cheddar cheese, grape wine, Bartlett pear; used in non-alcoholic beverages, alcoholic beverages, ice cream, ices, candy, baked goods.

199. ETHYL NONANOATE—FDA approved food additive; FEMA GRAS; found in apple, apricot, banana, beef, beer, bilberry wine, brandy apple, wheat bread, cocoa, elderberry, grape, nectarine, olive, peach; used in baked goods, beverages, ice cream, candy.

200. ETHYL OCTADECANOATE—FEMA GRAS; found in grapes, beer, brandy, maple syrup; used in non-alcoholic beverages, ice cream, ices, candy, alcoholic beverages.

201. ETHYL OCTANOATE—FDA approved food additive; FEMA GRAS; found in apple, banana, beer, blue cheese, apricot, bilberry wine, blackberry, brandy, wheat bread, broccoli, butter, capers; used in frozen dairy goods.

202. ETHYL OLEATE—FDA approved food additive; FEMA GRAS; found in melons, grapes, brandy, maple syrup; used in non-alcoholic beverages, candy, baked goods, gelatins and puddings, condiments and relishes.

203. ETHYL PALMITATE—FEMA GRAS; found in cheddar cheese, maple syrup, grape wine; used in nut products.

204. ETHYL PHENYLACETATE—FDA approved food additive; FEMA GRAS; found in apple, crisp bread, honey, beer, beli, bilberry wine, brandy, wheat bread, cantaloupe, chempedak fruit, cocoa, grape, grapefruit juice, guava, licorice, melon; used in gelatin and puddings, syrups, baked goods.

205. ETHYL PROPIONATE—FDA approved food additive; FEMA GRAS; found in apples, apricot, banana, beer, bilberry, blackberry, brandy, cantaloupe, cheddar cheese, cocoa, fig, grape, guava; used in baked goods, meat products, ice cream.

206. ETHYL SALICYLATE—FDA approved food additive; FEMA GRAS; found in strawberries, raspberries, wine, blackberry, brandy, mountain papaya, rum; used in baked goods, ice cream, chewing gum.

207. ETHYL trans-2-BUTENOATE—FDA approved food additive; FEMA GRAS; found in apples, cocoa, plum brandy, cantaloupe, cashews, dalieb fruit, grape, guava, kiwi fruit, mango, papaya; used in candy, baked goods.

208. ETHYL VALERATE—FDA approved food additive; FEMA GRAS; found in apple, banana, grape, apricot, bilberry wine, black currants, brandy, cashew apples, parmesan cheese, fig, guava, honey, kiwi fruit, melon, muskmelon; used in chewing gum, baked goods, beverages.

209. ETHYL VANILLIN—FDA GRAS; FEMA GRAS; found in vanilla beans; used in alcoholic beverages, imitation vanilla extract, breakfast cereals.

210. 2-ETHYL(OR METHYL)-(3,5 AND 6)-METHOXY-PYRAZINE—FEMA GRAS; found in coffee, potato sprouts; used in baked goods, candy, ice cream.

211. 2-ETHYL-1-HEXANOL—FEMA GRAS; used in non-alcoholic beverages, ice cream, ices, candy, chewing gum.

212. 3-ETHYL-2-HYDROXY-2-CYCLOPENTEN-1-ONE—FEMA GRAS; found in coffee, maple syrup, peanuts, pork; used in baked goods, soups, cereals, condiments, milk and dairy products.

213. 2-ETHYL-3,(5 OR 6)-DIMETHYLPYRAZINE—FEMA GRAS; found in beef, coffee, bread; used in baked goods, cereals, candy, dairy products.

214. 5-ETHYL-3-HYDROXY-4-METHYL-2(5H)—FURANONE—FEMA GRAS; nature identical by FEMA; found in beef, beer, wheat bread, cashew nuts, chicken, cocoa, coconut, coffee, crayfish, eggs, hazelnut; used in chewing gum, meat products.

215. 2-ETHYL-3-METHYLPYRAZINE—FEMA GRAS; found in beef, whole egg, chicken, heated corn oil, krill, lamb/mutton, boiled shrimp, fermented soy sauce; used in candy, ice cream, beverages.

216. 4-ETHYLBENZALDEHYDE—FEMA GRAS; found in oranges, carrots, broccoli, tomatoes; used in baked goods, meat products, candy, gelatins and puddings, confectionery/frosting, cereals, dairy products.

217. 4-ETHYLGUAIACOL—FDA approved food additive; FEMA GRAS; found in coffee, cranberry, smoked pork, rum, smoked sausage, tea, wine; used in non-alcoholic beverages, ice cream, ices.
218. para-ETHYLPHENOL—FEMA GRAS; found in cocoa, coffee, peanut, tomato, wine; used in baked goods, candy, gelatin and puddings, meat products.
219. 3-ETHYLPYRIDINE—FEMA GRAS; found in beef, chicken, coffee, corn oil, almond, barley, beer, wheat bread, cocoa, eggs; used in candy, ice cream, meat, baked goods.
220. EUCALYPTOL—FDA approved food additive; FEMA GRAS; found in black currants, blueberries, brandy, cantaloupe, cheese, cocoa, grapes, thyme, babaco fruit, bilberry, corn; used in chewing gum, ice cream, baked goods.
221. FARNESOL—FDA approved food additive; FEMA GRAS; found in oranges, lemon grass; used in non-alcoholic beverages, ice cream, candy, baked goods, gelatins and puddings.
222. D-FENCHONE—FDA approved food additive; FEMA GRAS; found in anise, basil, fennel, peppermint, saffron, thyme; used in ice cream, candy, baked goods.
223. FENNEL SWEET OIL—FDA GRAS; FEMA GRAS; found in fennel seeds; used in candy, alcoholic beverages, meats.
224. FENUGREEK, EXTRACT, RESIN, AND ABSOLUTE—FDA GRAS; FEMA GRAS; found in fenugreek; used in non-alcoholic beverages, gelatin and puddings, syrups.
225. FIG JUICE CONCENTRATE—Common food item; found in figs.
226. FOOD STARCH MODIFIED—FDA approved food additive; widespread; used in cured pork.
227. FURFURYL MERCAPTAN—FEMA GRAS; found in coffee, beef, chicken, meat, popcorn; used in non-alcoholic beverages, ice cream, ices, candy, baked goods, gelatins and puddings, icings.
228. 4-(2-FURYL)-3-BUTEN-2-ONE—FEMA GRAS; found in coffee; used in non-alcoholic beverages, ice cream, ices, candy, baked goods, gelatins and puddings, alcoholic beverages.
229. GALBANUM OIL—FDA approved food additive; FEMA GRAS; found in galbanum; used in meat products, baked goods, ice cream.
230. GENET ABSOLUTE—FDA approved food additive; FEMA GRAS; found in genet flowers; used in candy, baked goods, chewing gum.
231. GENTIAN ROOT EXTRACT—FEMA GRAS; found in gentian root; used in non-alcoholic beverages, ice cream, ices, candy, baked goods, alcoholic beverages.
232. GERANIOL—FDA GRAS; FEMA GRAS; found in apples, apricot, beer, bilberry, black currants, blackberries; used in baked goods, candy, ice cream.
233. GERANIUM ROSE OIL—FDA GRAS; FEMA GRAS; found in geranium leaves and stems; used in chewing gum, ice cream, baked goods.
234. GERANYL ACETATE—FDA GRAS; FEMA GRAS; found in celery, cocoa, black currants, chervil, gin, ginger, grape, grapefruit juice, orange juice, passion fruit, pineapple, plum; used in baked goods, ice cream, syrups.
235. GERANYL BUTYRATE—FDA approved food additive; FEMA GRAS; found in celery, tomatoes, passion fruit; used in gelatins and puddings, ice cream, candy.
236. GERANYL FORMATE—FDA approved food additive; FEMA GRAS; found in hops, black and green tea; used in baked goods, ice cream, candy.
237. GERANYL ISOVALERATE—FDA approved food additive; FEMA GRAS; used in non-alcoholic beverages, ice cream, ices, candy, baked goods, gelatins and puddings, chewing gum.
238. GERANYL PHENYLACETATE—FDA approved food additive; FEMA GRAS; found in Olibanum resin, sativa japonica; used in gelatins and puddings, baked goods, ice cream.
239. GINGER OIL AND OLEORESIN—FDA GRAS; FEMA GRAS; found in ginger; used in candy, baked goods, meats.
240. 1-GLUTAMIC ACID—FDA GRAS; FEMA GRAS; natural constituent of proteins in plants and animals; used in baked goods, meat, soups, milk/dairy products, condiments, pickles, cereal.
241. 1-GLUTAMINE—FDA approved food additive; FEMA GRAS; natural constituent of proteins in plants and animals; used in baked goods, meat products, candy, nut products, seasonings and flavorings.
242. GLYCEROL—FDA GRAS; FEMA GRAS; found in beer, cherry, wine; used in milk products, baked goods, meat products.
243. GLYCYRRHIZIN AMMONIATED—FDA GRAS; FEMA GRAS; found in licorice; used in non-alcoholic beverages, candy, baked goods, chewing gum, ice cream, ices.
244. GRAPE JUICE CONCENTRATE—common food item; found in grapes.
245. GUAIAC WOOD OIL—FDA approved food additive; FEMA GRAS; found in guaiac wood; used in meat products, ice cream, chewing gum.
246. GUAIACOL—FDA approved food additive; FEMA GRAS; found in celery, cocoa, coffee, rum, soybean, tea, tomato, whiskey, wine; used in ice cream, ices, baked goods, meat, chewing gum, dairy products.
247. GUAR GUM—FEMA GRAS; found in the seed of the guar plant which is similar to the soybean plant; used in breakfast cereal, dairy products, gravies, processed vegetables, baked goods.
248. 2,4-HEPTADIENAL—FEMA GRAS; found in avocado, beef, black currants, bread, wheat, broccoli, butter, heated butter, cabbage, cauliflower; used in meat products, baked goods, soups, candy.
249. gamma-HEPTALACTONE—FDA approved food additive; FEMA GRAS; found in mango, passion fruit, peach, black tea, asparagus, butter, hazelnut, lamb/mutton, leek, licorice, nectarine, papaya, pineapple; used in candy, baked goods, ice cream.
250. HEPTANOIC ACID—FDA approved food additive; FEMA GRAS; found in apple, beer, banana, beef, dried blue cheese, brandy, bread, wheat butter, cheddar cheese; used in baked goods, margarine, ice cream.
251. 2-HEPTANONE—FDA approved food additive; FEMA GRAS; found in apples, banana, beer, beef, apricot, asparagus, beans, blue cheese, wheat butter; used in gravies, ice cream, condiments, baked goods.
252. 3-HEPTEN-2-ONE—FEMA GRAS; found in capsicum peppers, hazelnut, hops, muruci; used in gelatin and puddings, ice cream, baked goods.
253. 2-HEPTEN-4-ONE—FEMA GRAS; found in roasted filbert; used in non-alcoholic beverages, ice cream, ices, baked goods, candy, gelatin and puddings, dairy products.
254. 4-HEPTENAL—FDA approved food additive; FEMA GRAS; found in butterfat, soybean oil; used in non-alcoholic beverages, baked goods, meat, candy, cereal, dairy products.

255. trans-2-HEPTENAL—FEMA GRAS; found in apple, chicken, cranberry, green pea, potato, tomato; used in baked goods, meat, meat sauces, soups, candy.
256. HEPTYL ACETATE—FEMA GRAS; found in apples, grapes, bananas, pears, plums, whiskey; used in baked goods, gelatins and puddings, chewing gum.
257. omega-6-HEXADECENLACTONE—FDA approved food additive; FEMA GRAS; found in Ambrette seed; used in baked goods, ice cream, candy.
258. gamma-HEXALACTONE—FDA approved food additive; FEMA GRAS; found in apricot, beef, butter, apple, asparagus, beer, blackberry, brandy, wheat bread; used in candy, baked goods, ice cream.
259. HEXANAL—FDA approved food additive; FEMA GRAS; found in apples, bananas, beef, bilberries, apricot, artichoke, asparagus, avocado, barley, beer, blackberry, blueberry, others; used in frozen dairy goods, baked goods, meat.
260. HEXANOIC ACID—FDA approved food additive; FEMA GRAS; found in apple, beef, beer, apricot, banana, barley, blackberry, blue cheese, blueberry, bread, wheat; used in condiment relish, ice cream, candy.
261. 2-HEXEN-1-OL—FDA approved food additive; FEMA GRAS; found in apples, apricots, bananas, beer, Swiss cheese, peaches, used in non-alcoholic beverages, candy, baked goods, gelatins and puddings.
262. 3-HEXEN-1-OL—FDA approved food additive; FEMA GRAS; found in apple, banana, bean, celery, grape, apricot, cantaloupe, pineapple, honeydew melon; used in chewing gum, ice cream, candy, baked goods.
263. cis-3-HEXEN-1-YL ACETATE—FEMA GRAS; found in apple juice, apricot, artichoke, asparagus, avocado, banana, beans, beef, beer, blackberry, blueberry, dried bonito, grape brandy, wheat bread; used in ices, candy, baked goods.
264. 2-HEXENAL—FDA approved food additive; FEMA GRAS; found in apple, banana, raspberry, strawberry, beer, chicken, fat, grape, guava, hops, peach, pork, black and green tea; used in frozen dairy goods, baked goods, candy.
265. 3-HEXENOIC ACID—FEMA GRAS; found in banana, pork fat, raspberry, black tea; used in non-alcoholic beverages, ice cream, dairy products, candy, chewing gum.
266. trans-2-HEXENOIC ACID—FEMA GRAS; found in apples, bananas, beer, apple juice, artichoke, beans, beef, blackberry, blueberry; used in beverages, candy, baked goods, gelatins and puddings, frozen desserts.
267. cis-3-HEXENYL FORMATE—FEMA GRAS; found in tea, cognac; used in baked goods, chewing gum, preserves and spreads.
268. HEXYL 2-METHYLBUTYRATE—FDA approved food additive; FEMA GRAS; found in apples, strawberries, apricot, apple brandy, grape, Asian pear, plum, native spearmint; used in gelatins and puddings, candy, ice cream.
269. HEXYL ACETATE—FDA approved food additive; FEMA GRAS; found in apples, bananas, beer, apricot, beef, black currants, blackberry, blueberry, brandy, cantaloupe, capers, coffee; used in candy, baked goods, meat products.
270. HEXYL ALCOHOL—FDA approved food additive; FEMA GRAS; found in apple, banana, beef, chicken, coffee, pineapple, potato; used in baked goods, gelatin and puddings, dairy products.
271. HEXYL PHENYLACETATE—FDA approved food additive; FEMA GRAS; found in grape, tea, scotch spearmint, black and green tea; used in frozen dairy goods, candy, baked goods.
272. 1-HISTIDINE—FEMA GRAS; found in milk, cheese, grains, meats, poultry, eggs, fish, vegetables, nuts, fruit; used in baked goods, meat products, milk products, confectionery and frosting.
273. HONEY—common food item.
274. HOPS OIL—FDA GRAS; FEMA GRAS; used in gelatin pudding, chewing gum, baked goods.
275. HYDROLYZED MILK SOLIDS—USDA approved meat flavor; found in milk; used in meats, sauces and stuffings.
276. HYDROLYZED PLANT PROTEINS—FDA GRAS; found in plants; used in baked goods, milk and dairy products, meat products, baby formulas, soups, condiments and relishes.
277. 5-HYDROXY-2,4-DECADIENOIC ACID delta-LACTONE—FEMA GRAS; found in peaches, beef; used in chewing gum, cheese, condiments.
278. 4-HYDROXY-2,5-DIMETHYL-3(2H)-FURANONE—FEMA GRAS; found in beef, maple syrup, cassia oil; used in frozen dairy goods, baked goods, candy.
279. 2-HYDROXY-3,5,5-TRIMETHYL-2-CYCLOHEXEN-1-ONE—FEMA GRAS; found in rose oil, gardenia; used in frozen dairy goods, candy.
280. 4-HYDROXY-3-PENTENOIC ACID LACTONE—FEMA GRAS; found in bread, grapes, soy beans; used in ice cream, ices, candy, baked goods, gelatins and puddings, meat, meat sauces, soups, milk and dairy products, cereals.
281. 2-HYDROXY-4-METHYLBENZALDEHYDE—FEMA GRAS; found in blackberry, capers, cranberry, raspberry, sea buckthorn; used in baked goods.
282. 4-HYDROXYBUTANOIC ACID LACTONE—FEMA GRAS; found in apricots, bread, coffee, cocoa, mushroom, onion, wine; used in dairy products, breakfast cereals, meat products.
283. HYDROXYCITRONELLAL—FDA approved food additive; FEMA GRAS; found in beef, mushroom, nectarine, peach; used in candy, ice cream, baked goods.
284. 6-HYDROXYDIHYDROTHEASPIRANE—FEMA GRAS; found in black tea; used in non-alcoholic beverages, ice cream, candy, gelatin and puddings.
285. 4-(para-HYDROXYPHENYL)-2-BUTANONE—FDA approved food additive; FEMA GRAS; found in almond, beef, coffee, grape, guava, hazelnut, pineapple, popcorn, raspberry, soy sauce, strawberry; used in chewing gum, ice cream, baked goods.
286. HYSSOP OIL—FDA GRAS; FEMA GRAS; used in alcoholic beverages, ice cream, candy, baked goods.
287. IMMORTELLE ABSOLUTE AND EXTRACT—FDA GRAS; FEMA GRAS; used in baked goods, candy, gelatin and puddings, chewing gum, frozen dairy products.
288. alpha-IONONE—FDA approved food additive; FEMA GRAS; found in raspberry, almond, banana, blackberry, grape brandy, raspberry brandy, capers, carrots, celery, cherry, grapefruit juice, kumazasa, mango ginger, peach, peas, plum; used in chewing gum, ice cream, baked goods
289. beta-IONONE—FDA approved food additive; FEMA GRAS; found in carrot, almonds, apricot, beer, blackberry, brandy, broccoli, capers, cherry, endive; used in candy, baked goods, ice cream.
290. alpha-IRONE—FDA approved food additive; FEMA GRAS; found in raspberry; used in baked goods, frozen dairy, soft candy, gelatin and puddings, alcoholic beverages.
291. ISOAMYL ACETATE—FDA approved food additive; FEMA GRAS; found in apple, banana, beer, apricot, blackberry, blackberry brandy, wheat bread, butter; used in chewing gum, ice cream, baked goods.

292. ISOAMYL BENZOATE—FDA approved food additive; FEMA GRAS; found in beer, cherries, cocoa, papaya; used in baked goods, candy, gelatin and puddings.
293. ISOAMYL BUTYRATE—FDA approved food additive; FEMA GRAS; found in banana, blue cheese, grape, apple, apricot, beer, apple brandy, grape brandy, guava, honey, mango; used in non-alcoholic beverages, ice cream, baked goods, chewing gum.
294. ISOAMYL CINNAMATE—FDA approved food additive; FEMA GRAS; found in wine, cinnamon, styrax; used in baked goods, candy, gelatin and puddings.
295. ISOAMYL FORMATE—FDA approved food additive; FEMA GRAS; found in apple, beer, chicken, honey, eggs, rum, strawberries, tea, vinegar, grape brandy, whiskey, wine; used in baked goods, candy.
296. ISOAMYL HEXANOATE—FDA approved food additive; FEMA GRAS; found in apple, apricot, banana, grapefruit juice, plums, strawberries, beer, grape brandy, plum brandy, rum, sherry; used in candy, chewing gum.
297. ISOAMYL ISOVALERATE—FDA approved food additive; FEMA GRAS; found in banana, tomato, beer, sherry, spearmint, scotch; used in frozen dairy goods, candy.
298. ISOAMYL OCTANOATE—FDA approved food additive; FEMA GRAS; found in banana, beer, grape, strawberry; used in baked goods, soft candy, gelatin and puddings, alcoholic beverages.
299. ISOAMYL PHENYLACETATE—FDA approved food additive; FEMA GRAS; found in peppermint oil; used in baked goods, candy, chewing gum.
300. ISOBORNYL ACETATE—FDA approved food additive; FEMA GRAS; found in kiwi fruit; used in soft candy.
301. ISOBUTYL ACETATE—FDA approved food additive; FEMA GRAS; found in apples, bananas, cantaloupe, cocoa, figs, honeydew melon, beer, grape, guava, mango, melon; used in chewing gum, gelatin and puddings.
302. ISOBUTYL ALCOHOL—FDA approved food additive; FEMA GRAS; found in beef, blackberry, apple, apricot, banana, barley, brandy; used in gelatin and puddings, candy, baked goods.
303. ISOBUTYL CINNAMATE—FDA approved food additive; FEMA GRAS; found in coffee, tomato, mullein leaves; used in candy, ice cream, baked goods.
304. ISOBUTYL PHENYLACETATE—FDA approved food additive; FEMA GRAS; found in cocoa; used in baked goods, ice cream, candy.
305. ISOBUTYL SALICYLATE—FDA approved food additive; FEMA GRAS; found in *Feijoa* fruit; used in soft candy, baked goods.
306. 2-ISOBUTYL-3-METHOXYPYRAZINE—FEMA GRAS; found in bean, coffee, pea, pepper, potato, spinach, grape; used in non-alcoholic beverages, ice cream, dairy products.
307. alpha-ISOBUTYLPHENETHYL ALCOHOL—FDA approved food additive; FEMA GRAS; used in non-alcoholic beverages, alcoholic beverages, ice cream, ices, candy, gelatin and puddings, baked goods.
308. ISOBUTYRALDEHYDE—FDA approved food additive; FEMA GRAS; found in apple, banana, barley, beans, beef, beer, blue cheese, brandy, bread, wheat, butter; used in gelatin and puddings, candy, frozen dairy products.
309. ISOBUTYRIC ACID—FDA approved food additive; FEMA GRAS; found in apple, beef, beer, celery, banana, blue cheese, grape brandy, wheat bread, cashew apples, cheddar cheese; used in baked goods, candy, gelatin and puddings.
310. d,l-ISOLEUCINE—FEMA GRAS; natural constituent of protein in plants and animals; used in milk products, meat products, condiment relish, soups.
311. alpha-ISOMETHYLIONONE—FDA approved food additive; FEMA GRAS; used in baked goods, soft candy, gelatin and puddings, chewing gum.
312. 2-ISOPROPYLPHENOL—FEMA GRAS; found in Japanese whiskey; used in meat, soups, condiments.
313. ISOVALERIC ACID—FDA approved food additive; FEMA GRAS; found in apple, beer, banana, blue cheese, grape brandy, wheat bread, heated butter, capers, cashew apples, cheddar cheese; used in frozen dairy goods, candy, cheese.
314. JASMINE ABSOLUTE, CONCRETE and OIL—FDA GRAS; FEMA GRAS; found in jasmine flowers; used in baked goods, chewing gum, candy.
315. KOLA NUT EXTRACT—FDA GRAS; FEMA GRAS; found in kola nut; used in gelatin pudding, ice cream, candy.
316. LABDANUM ABSOLUTE AND OLEORESIN—FDA approved food additive; FEMA GRAS; used in baked goods, frozen dairy products, gelatin and puddings.
317. LACTIC ACID—FDA GRAS; FEMA GRAS; found in apple juice, beef, beer, bread, cocoa, coffee, wheat bread, cherry, grape, guava, mango, milk, papaya, dry salami, sherry, tomato; used in cheese, candy, chewing gum, baked goods.
318. LAURIC ACID—FDA GRAS; FEMA GRAS; found in apple, beer, blue cheese, banana, beef, blackberry, brandy, wheat bread, butter, heated butter, cantaloupe, cashew nuts; used in baked goods, candy, ice cream.
319. LAURIC ALDEHYDE—FDA approved food additive; FEMA GRAS; found in apples, beef, beer, wheat bread, carrots, celery, cheddar cheese, blackberry, butter, cabbage, caviar, chicken; used in chewing gum, baked goods, candy.
320. LAVANDIN OIL—FDA GRAS; FEMA GRAS; found in lavender plant; used in baked goods, candy, chewing gum.
321. LAVENDER OIL—FDA GRAS; FEMA GRAS; found in lavender flowers; used in soft candy, baked goods, gelatin and puddings.
322. LEMON OIL AND EXTRACT—FDA GRAS; FEMA GRAS; found in lemons; used in candy, breakfast cereals, frozen dairy products.
323. LEMONGRASS OIL—FDA GRAS; FEMA GRAS; found in lemongrass; used in chewing gum, ice cream, baked goods.
324. l-LEUCINE—FDA approved food additive; FEMA GRAS; found in proteins; essential amino acid; used in soups, baked goods, breakfast cereals.
325. LEVULINIC ACID—FDA approved food additive; FEMA GRAS; found in wheat bread, papaya; used in reconstituted vegetables, ice cream, baked goods.
326. LICORICE ROOT, FLUID EXTRACT AND POWDER—FDA GRAS; FEMA GRAS; found in glycyrrhizia; used in candy, baked goods, meat products.
327. LIME OIL—FDA GRAS; FEMA GRAS; found in lime; used in frozen dairy goods, candy.
328. LINALOOL—FDA GRAS; FEMA GRAS; found in banana, beer, blackberry, beans, blueberry, apple, apricot, arctice bramble, artichoke, grape brandy, plum brandy; used in meat products.
329. LINALOOL OXIDE—FDA approved food additive; FEMA GRAS; found in oranges, apricot, coffee; used in ice cream, baked goods, candy.

330. LINALYL ACETATE—FDA GRAS; FEMA GRAS; found in bergamot, clary sage, lemon oil, pepper, tomato, lavender; used in baked goods, dairy products, candy.
331. LINDEN FLOWERS—FDA GRAS; FEMA GRAS; found in linden flowers; used in non-alcoholic beverages.
332. LOVAGE OIL AND EXTRACT—FDA approved food additive; FEMA GRAS; found in levisticum; used in sweet sauce, alcoholic beverages, ice cream.
333. 1-LYSINE—FDA approved food additive; amino acid, natural constituent of plant and animal proteins; used in meat products, breakfast cereals.
334. MACE POWDER, EXTRACT AND OIL—FDA GRAS; FEMA GRAS; found in mace; used in alcoholic beverages, candy, frozen dairy products.
335. MAGNESIUM CARBONATE—FDA GRAS; used in flour, baked goods, frozen dairy products.
336. MALIC ACID—FDA GRAS; FEMA GRAS; found in celery, cocoa, orange juice, grape brandy, sour cherry, gin, grapefruit juice, honey, hops, kiwi fruit, mango, mushroom; used in frozen dairy goods, candy, baked goods.
337. MALT AND MALT EXTRACT—FDA GRAS; found in barley; used in beer, frozen dairy products, baked goods.
338. MALTODEXTRIN—FDA GRAS; used in baked goods, candy, frozen dairy.
339. MALTOL—FDA approved food additive; FEMA GRAS; found in barley, cocoa, coffee, beef, wheat bread, butter, hazelnut, licorice, malt, milk, peanut; used in frozen dairy goods, jellies, baked goods.
340. MALTYL ISOBUTYRATE—FEMA GRAS; used in baked goods, soft candy, gelatin and puddings, jam and jelly.
341. MANDARIN OIL—FDA GRAS; FEMA GRAS; found in tangerines, mandarin oranges; used in candy, frozen dairy products.
342. MAPLE SYRUP AND CONCENTRATE—common food item.
343. MATE LEAF, ABSOLUTE, AND OIL—FDA GRAS; found in mate leaves; used in flour, meat, poultry.
344. para-MENTHA-8-THIOL-3-ONE—FEMA GRAS; used in frozen dairy, soft candy, gelatin and puddings, baked goods.
345. MENTHOL—FDA approved food additive; FEMA GRAS; found in peppermint plant, honey, mint, rum, cocoa, eggs, guava, raspberry, rice, spearmint; used in candy, mouthwash.
346. MENTHONE—FDA approved food additive; FEMA GRAS; found in celery, clams, cocoa, peppermint, raspberries, rice, spearmint; used in baked goods, candy.
347. MENTHYL ACETATE—FEMA GRAS; found in peppermint oil, orange juice, raspberries; used in baked goods, frozen dairy, soft candy, gelatin and pudding.
348. dl-METHIONINE—FDA approved food additive; FEMA GRAS; natural constituent of protein in plants and animals; used in breakfast cereals, meat products, condiment relish, soups.
349. METHOPRENE—EPA approved pesticide for use on tobacco; allowed by FDA to be used in raisins, prunes, peaches, oat cereals; also approved by EPA for eggs, milk, poultry.
350. 2-METHOXY-4-METHYLPHENOL—FDA approved food additive; FEMA GRAS; found in cocoa, sausage, banana, beer, coffee; used in baked goods, meat products.
351. 2-METHOXY-4-VINYLPHENOL—FDA approved food additive; FEMA GRAS; found in bean, coffee, sherry, whiskey, banana, beer, cocoa, cured ham, malt; used in meat products, ice cream, baked goods.
352. para-METHOXYBENZALDEHYDE—FDA approved food additive; FEMA GRAS; found in coffee, tea, tomato, beer, krill; used in baked goods, candy, dairy products.
353. 1-(para-METHOXYPHENYL)-1-PENTEN-3-ONE—FDA approved food additive; FEMA GRAS; found in jasmine, Ylang Ylang; used in soft candy, sweet sauce, baked goods.
354. 4-(para-METHOXYPHENYL)-2-BUTANONE—FDA approved food additive; FEMA GRAS; found in apricot, beer, brandy, grapes, cantaloupe, cranberry, honey, melon, peppermint, plum, raspberry, salami; used in candy, baked goods.
355. 1-(para-METHOXYPHENYL)-2-PROPANONE—FDA approved food additive; FEMA GRAS; found in chervil; used in baked goods, frozen dairy, soft candy, gelatin and puddings.
356. METHOXYPYRAZINE—FEMA GRAS; found in beef, cocoa; used in meat products, soups, gravies, baked goods.
357. METHYL 2-FUROATE—FEMA GRAS; found in almond, cocoa, coffee, peanut, wine; used in non-alcoholic beverages, ice cream, candy, baked goods.
358. METHYL 2-OCTYNOATE—FDA approved food additive; FEMA GRAS; used in baked goods, frozen dairy products, gelatin and puddings.
359. METHYL 2-PYRROLYL KETONE—FEMA GRAS; found in apple juice, cocoa, coffee, onion, peanut; used in baked goods, candy, gelatin and puddings, meat products.
360. METHYL ANISATE—FDA approved food additive; FEMA GRAS; used in non-alcoholic beverages, frozen dairy, baked goods, soft candy, gelatin and puddings.
361. METHYL ANTHRANILATE—FDA GRAS; FEMA GRAS; found in cocoa, grape, tea, wine, coffee, strawberry; used in baked goods, candy, frozen dairy products.
362. METHYL BENZOATE—FDA approved food additive; FEMA GRAS; found in banana, cherry, coffee, brandy, butter, cashew apple; used in chewing gum, ice cream, candy.
363. METHYL CINNAMATE—FDA approved food additive; FEMA GRAS; found in guava, strawberry, cranberry, pineapple, plum; used in baked goods, candy, gelatin and puddings.
364. METHYL DIHYDROJASMONATE—FEMA GRAS; used in non-alcoholic beverages, ice cream, ices, baked goods, candy.
365. METHYL ESTER OF ROSIN, PARTIALLY HYDROGENATED—FDA approved food additive; used in baked goods, candy.
366. METHYL ISOVALERATE—FDA approved food additive; FEMA GRAS; found in apple, peach, pineapple, banana, blackberry, parmesan cheese, coffee, honey, nectarine, olives, peas, strawberries; used in candy, baked goods.
367. METHYL LINOLEATE (48%) METHYL LINOLENATE (52%) MIXTURE; FEMA GRAS; found in banana, grape, grapefruit juice, melon, strawberries; used in ice cream, baked goods, candy.
368. METHYL NAPHTHYL KETONE—FDA approved food additive; FEMA GRAS; found in beef (heated); used in chewing gum.
369. METHYL NICOTINATE—FEMA GRAS; found in coffee, nuts, strawberry, beef, beer, guava, hazelnuts, peanut, plum; used in baked goods, candy, ice cream.
370. METHYL PHENYLACETATE—FDA approved food additive; FEMA GRAS; found in coffee, cocoa; used in candy, syrups, baked goods.

371. METHYL SALICYLATE—FDA approved food additive; FEMA GRAS; found in blackberry, broccoli, butter, cherry cake, coffee; used in candy, ice cream, syrups.
372. METHYL SULFIDE—FDA approved food additive; FEMA GRAS; found in asparagus, bean, beef, beer, white bread, brussels sprouts, butter, cabbage, carrot, cauliflower, broccoli; used in meat products, candy, ice cream.
373. 3-METHYL-1-CYCLOPENTADECANONE—FEMA GRAS; found in grape brandy, lamb/mutton, potato; used in baked goods.
374. 4-METHYL-1-PHENYL-2-PENTANONE—FDA approved food additive; FEMA GRAS; used in gelatin pudding.
375. 5-METHYL-2-PHENYL-2-HEXENAL—FEMA GRAS; found in romano cheese, potato chips; used in soft candy.
376. 5-METHYL-2-THIOPHENECARBOXALDEHYDE—FEMA GRAS; found in coffee, roasted peanut, popcorn, cooked beef; used in baked goods, meats, soups, candy, gelatin and puddings, chewing gum, dairy products, condiments.
377. 6-METHYL-3,5-HEPTADIEN-2-ONE—FDA approved food additive; FEMA GRAS; found in almonds, asparagus, beef, beer, wheat bread, cashew nuts, chicken; used in snack foods.
378. 2-METHYL-3-(para-ISOPROPYLPHENYL)PROPIONALDEHYDE—FDA approved food additive; FEMA GRAS; found in almond, beans, beef, beer, wheat bread, chicken, cocoa, coffee, guava, macadamia nut; used in gelatin pudding.
379. 5-METHYL-3-HEXEN-2-ONE—FEMA GRAS; found in roasted filbert; used in baked goods, cereals, candy, gelatin and puddings, dairy products.
380. 1-METHYL-3-METHOXY-4-ISOPROPYLBENZENE—FEMA GRAS; found in tangerine peel, thyme; used in non-alcoholic beverages, baked goods, meat, candy, condiments.
381. 4-METHYL-3-PENTENE-2-ONE—FEMA GRAS; found in rye bread, coffee, tea, peanut; used in non-alcoholic beverages, baked goods, candy, gelatin and puddings, dairy products.
382. 2-METHYL-4-PHENYLBUTYRALDEHYDE—FEMA GRAS; used in non-alcoholic beverages, ice cream, candy, gelatin and puddings.
383. 6-METHYL-5-HEPTEN-2-ONE—FDA approved food additive; FEMA GRAS; found in guava, mango, potato, rum; used in gravies, candy, baked goods.
384. 4-METHYL-5-THIAZOLEETHANOL—FEMA GRAS; found in cocoa, malt, peanuts roasted; used in meat products.
385. 4-METHYL-5-VINYLTHIAZOLE—FEMA GRAS; found in cocoa, nuts, passion fruit; used in Ice cream, baked goods, meat sauce, candy, chewing gum.
386. METHYL-alpha-IONONE—FDA approved food additive; FEMA GRAS; used in baked goods.
387. METHYL-trans-2-BUTENOIC ACID—FEMA GRAS; found in celery oil, orange juice crystals, coffee, strawberry; used in baked goods, meat products, soups.
388. 4-METHYLACETOPHENONE—FDA approved food additive; FEMA GRAS; found in hop oil, cocoa powder, black currant; used in chewing gum.
389. para-METHYLANISOLE—FDA approved food additive; FEMA GRAS; found in cocoa, malt, peanut, pork, potato chips, sesame seeds; used in baked goods.
390. alpha-METHYLBENZYL ACETATE—FDA approved food additive; FEMA GRAS; found in grape brandy, rice, tea, tomato, tomato paste; used in chewing gum.
391. alpha-METHYLBENZYL ALCOHOL—FEMA GRAS; found in mushroom, hops, grapes, endive, cranberry; used in baked goods.
392. 2-METHYLBUTYRALDEHYDE—FDA approved food additive; FEMA GRAS; found in beef, apple, cheddar cheese, coffee, cranberry, eggs, fish, lettuce, olive, onion, peas, tomato; used in gelatin pudding.
393. 3-METHYLBUTYRALDEHYDE—FDA approved food additive; FEMA GRAS; found in apple, banana, bread, tomato, rice, blackberry; used in baked goods.
394. 2-METHYLBUTYRIC ACID—FDA approved food additive; FEMA GRAS; found in apple, apricot, avocado, beef, beer, blackberry, brandy, butter, cantaloupes, carrots; used in cheese, ice cream, candy.
395. alpha-METHYLCINNAMALDEHYDE—FDA approved food additive; FEMA GRAS; found in blackberry, cauliflower, cherry, cocoa, endive, guava, honey, peach; used in candy.
396. METHYLCYCLOPENTENOLONE—FDA approved food additive; FEMA GRAS; found in carambola (starfruit), cheese, tomato; used in breakfast cereals, baked goods, candy.
397. 2-METHYLHEPTANOIC ACID—FDA approved food additive; FEMA GRAS; found in gardenia flower oil, almonds, cocoa, coffee, soy sauce, onions; used in baked goods, ice cream, candy.
398. 2-METHYLHEXANOIC ACID—FEMA GRAS; found in apple, avocado, banana, barley, beans, beef, beer, blackberry, blue cheese, wheat bread, butter; used in baked goods, candy, gelatin and puddings.
399. 3-METHYLPENTANOIC ACID—FEMA GRAS; found in apple, apricot, beer, blackberry, blueberry, wheat bread, romano cheese, chicken; used in baked goods.
400. 4-METHYLPENTANOIC ACID—FEMA GRAS; found in apple, grapes, cocoa, strawberry, tomato; used in condiment relish.
401. 2-METHYLPYRAZINE—FEMA GRAS; found in peppermint oil, tomato, popcorn; used in milk products, baked goods, candy.
402. 5-METHYLQUINOXALINE—FEMA GRAS; found in roasted almonds, coffee; used in frozen dairy, beverages, candy, gelatins.
403. 2-METHYLTETRAHYDROFURAN-3-ONE—FEMA GRAS; found in coffee; used in gravies.
404. (METHYLTHIO)METHYLPYRAZINE (MIXTURE OF ISOMERS); FEMA GRAS; used in baked goods, candy.
405. 3-METHYLTHIOPROPIONALDEHYDE—FEMA GRAS; found in bean, bread, cheese, cocoa bean, roasted nuts, milk, soy sauce, tomato; used in ice cream, ices, baked goods, dairy products, fats/oils.
406. METHYL 3-METHYLTHIOPROPIONATE—FDA approved food additive; FEMA GRAS; found in cantaloupe, pineapple; used in candy, baked goods, beverages, syrups.
407. 2-METHYLVALERIC ACID—FDA approved food additive; FEMA GRAS; found in almond, barley, wheat bread, cocoa, coffee, hazelnut, licorice, malt, peanut, soy sauce, lamb/mutton; used in frozen dairy products, candy.
408. MIMOSA ABSOLUTE AND EXTRACT—FDA approved food additive; FEMA GRAS; found in mimosa flowers; used in frozen dairy products.
409. MOLASSES EXTRACT AND TINCTURE—FDA GRAS; found in refined sugars; common food item.
410. MOUNTAIN MAPLE SOLID EXTRACT—FDA approved food additive; FEMA GRAS; found in mountain maple tree sap; used in baked goods.

411. MULLEIN FLOWERS—FDA approved food additive; natural flavor.
412. MYRISTALDEHYDE—FDA approved food additive; FEMA GRAS; found in apricot, cucumber; used in frozen dairy products, beverages, baked goods, gelatin.
413. MYRISTIC ACID—FDA approved food additive; FEMA GRAS; found in apple, banana, beef, beer, blackberry, brandy grape, butter, cantaloupe, cashew nuts, cheese (blue, cheddar); used in non-alcoholic beverages, candy, baked goods.
414. MYRRH OIL—FDA approved food additive; FEMA GRAS; found in myrrh; used in alcoholic beverages.
415. beta-NAPTHYL ETHYL ETHER—FEMA GRAS; used in soft candy.
416. NEROL—FDA approved food additive; FEMA GRAS; found in apricot, beer, blackberry, blueberry, brandy grape, cranberry, gin, grape, grapefruit juice, honey, hops, wine; used in frozen dairy products.
417. NEROLI BIGARDE OIL—FDA GRAS; FEMA GRAS; found in oranges; used in baked goods, candy.
418. NEROLIDOL—FDA approved food additive; FEMA GRAS; found in grapefruit, hops, lime, grapefruit oil; used in non-alcoholic beverages, ice cream, ices, candy, baked goods.
419. NONA-2-trans,6-cis-DIENAL—FEMA GRAS; found in apple, banana, beef, beer, blue cheese, cheddar cheese, brandy plum; used in frozen dairy goods.
420. 2,6-NONADIEN-1-OL—FDA approved food additive; FEMA GRAS; found in cucumber, frozen pea, whole soybean, tomato; used in baked goods, candy, gelatin and puddings, gravies.
421. gamma-NONALACTONE—FDA approved food additive; FEMA GRAS; found in beer, wheat bread, capers, cherry, chicken, clam; used in candy, baked goods, ice cream.
422. NONANAL—FDA approved food additive; FEMA GRAS; found in apricot, asparagus, beef, blackberry, wheat bread, cantaloupe, cocoa; used in baked goods.
423. NONANOIC ACID—FDA approved food additive; FEMA GRAS; found in apple, apricot, artichoke, avocado, banana, beef, beer, wheat bread; used in baked goods, candy, meat products.
424. 2-NONANONE—FDA approved food additive; FEMA GRAS; found in strawberry; used in dairy products, condiments.
425. trans-2-NONEN-1-OL—FEMA GRAS; found in asparagus, brandy grape, cucumber, melon, nectarine, plum, prickly pear, wine; used in baked goods.
426. 2-NONENAL—FEMA GRAS; found in asparagus, carrot, cherry, cucumber, egg, endive, olives, peach, peas, tomato, watermelon; used in meat products.
427. NONYL ACETATE—FDA approved food additive; FEMA GRAS; found in apple, beer, cantaloupe, grape, grapefruit juice, honeydew melon, milk, used in frozen dairy products.
428. NUTMEG POWDER AND OIL—FDA GRAS; FEMA GRAS; found in nutmeg; used in condiments, baked goods.
429. OAK CHIPS EXTRACT AND OIL—FDA approved food additive; FEMA GRAS; found in oak tree wood chips; used in baked goods.
430. OAK MOSS ABSOLUTE—FDA approved food additive; FEMA GRAS; found in essential oil of lichen, oak moss; used in meat products, candy, ice cream.
431. 9,12-OCTADECADIENOIC ACID (48%) AND 9,12,15-OCTADECATRIENOIC ACID (52%); FDA GRAS; FEMA GRAS; found in potato, tomato, apple, beer, cheese, country ham; used in preserves, spreads, candy, gelatin and puddings.
432. delta-OCTALACTONE—FEMA GRAS; found in apricot, beef, blackberry, butter, cheese (blue, cheddar, parmesan), cranberry, cream, coconut; used in candy, margarine, baked goods.
433. gamma-OCTALACTONE—FDA approved food additive; FEMA GRAS; found in apricot, asparagus, beef, beer, blackberry, blue cheese, brandy grape, cantaloupe, cherry, chicken, cranberry; used in baked goods, candy, ice cream.
434. OCTANAL—FDA approved food additive; FEMA GRAS; found in apple, apricot, artichoke, avocado, beef, beer, blackberry, brandy, wheat bread, butter; used in frozen dairy products, beverages, baked goods, candy.
435. OCTANOIC ACID—FDA GRAS; FEMA GRAS; found in apple, banana, beef, blackberry, plum brandy, wheat butter, beer, blue cheese; used in snack foods, baked goods, candy.
436. 1-OCTANOL—FDA approved food additive; FEMA GRAS; found in apple, apricot, blueberry, cantaloupe, celery, cherry, fish, grape, mushroom, pear, peas, strawberry; used in chewing gum, beverages, ice cream, baked goods, candy.
437. 2-OCTANONE—FDA approved food additive; FEMA GRAS; found in apple, banana, beef, cheese, coffee, cocoa, milk, peanut, tea, wine; used in baked goods, candy, gelatin and puddings, dairy products.
438. 3-OCTEN-2-ONE—FEMA GRAS; found in roasted filbert, mushroom, dried pea, tea; used in non-alcoholic beverages, ice cream, baked goods, condiments, candy, dairy products.
439. 1-OCTEN-3-OL—FDA approved food additive; FEMA GRAS; found in mushroom, peppermint, spearmint; used in processed vegetables.
440. 1-OCTEN-3-YL ACETATE—FDA approved food additive; FEMA GRAS; found in asparagus, avocado, beef, wheat bread, cabbage, capers, caviar, butter; used in snack foods.
441. 2-OCTENAL—FEMA GRAS; found in asparagus, beer, banana, beans, blue cheese, butter, cantaloupe, capers, chicken; used in snack foods, baked goods, dairy products.
442. OCTYL ISOBUTYRATE—FDA approved food additive; FEMA GRAS; found in hops, plum; used in baked goods, beverages, ice cream, candy.
443. OLEIC ACID—FDA approved food additive; FEMA GRAS; found in apple, banana, grape, ginger, potato, strawberry, tomato; used in condiment relish, citrus fruit, yeast, sugar beets.
444. OLIBANUM OIL—FDA approved food additive; FEMA GRAS; found in gum resin exudate; used in non-alcoholic beverages, ice cream, ices, candy, baked goods.
445. OPOPONAX OIL AND GUM—FDA approved food additive; found in opoponax, opoponas; natural flavor; used in alcoholic beverages.
446. ORANGE BLOSSOMS WATER, ABSOLUTE AND LEAF ABSOLUTE—FDA GRAS; FEMA GRAS; found in oranges; used in non-alcoholic beverages, ice cream, ices, candy, baked goods.
447. ORANGE OIL AND EXTRACT—FDA GRAS; FEMA GRAS; found in oranges; used in non-alcoholic beverages, ice cream, ices, baked goods, condiments, candy, gelatin and puddings, chewing gum.
448. ORIGANUM OIL—FDA GRAS; FEMA GRAS; found in origanum flowers; used in soups.

449. ORRIS CONCRETE OIL AND ROOT EXTRACT—FDA approved food additive; FEMA GRAS; found in orris roots; used in gelatin pudding, alcoholic beverages.
450. PALMAROSA OIL—FDA GRAS; FEMA GRAS; found in geranium; used in baked goods.
451. PALMITIC ACID—FEMA GRAS; found in apple, beer, celery, cheddar cheese, milk, potato, tomato; used in meat products, baked goods.
452. PARSLEY SEED OIL—FDA GRAS; FEMA GRAS; found in parsley; used in soups.
453. PATCHOULI OIL—FDA approved food additive; FEMA GRAS; found in dried leaves of *Pogostemon cablin* Benth.; used in non-alcoholic beverages, ice cream, ices, baked goods, candy, chewing gum.
454. omega-PENTADECALACTONE—FDA approved food additive; FEMA GRAS; used in baked goods; ice cream, candy.
455. 2,3-PENTANEDIONE—FDA approved food additive; FEMA GRAS; found in nuts, beef, beer, bread, chicken, cocoa, coffee, tomato, yogurt; used in baked goods, candy, gelatin and puddings.
456. 2-PENTANONE—FDA approved food additive; FEMA GRAS; found in apple juice, banana, beef, cheese, chicken, grape, ham, honey, peanut; used in non-alcoholic beverages, ice cream, ices, candy, baked goods.
457. 4-PENTENOIC ACID—FDA approved food additive; FEMA GRAS; used in soft candy, beverages, baked goods, margarine.
458. 2-PENTYLPYRIDINE—FEMA GRAS; found in cooked meat, peppers, hazel nut, roasted peanuts; used in candy, baked goods, ice cream.
459. PEPPER OIL, BLACK AND WHITE—FDA GRAS; FEMA GRAS; found in pepper corns; used in condiments, ice cream, baked goods.
460. PEPPERMINT OIL—FDA GRAS; FEMA GRAS; found in peppermint; used in chewing gum, meat products, ice cream, baked goods.
461. PERUVIAN (BOIS DE ROSE) OIL—FDA GRAS; FEMA GRAS; used in baked goods, candy, chewing gum.
462. PETITGRAIN ABSOLUTE, MANDARIN OIL AND TERPENELESS OIL; FDA GRAS; FEMA GRAS; found in bitter orange tree, leaves, and twigs, oranges; used in baked goods, condiments, candy.
463. alpha-PHELLANDRENE—FDA approved food additive; FEMA GRAS; found in apple, gin, hops, mango, nectarine, papaya, paprika, parsley, beans, carrots; used in milk products, baked goods, candy.
464. 2-PHENETHYL ACETATE—FDA approved food additive; FEMA GRAS; found in apple, banana, beer, brandy, raspberry, wheat bread, butter, cantaloupe; used in candy, ice cream, baked goods.
465. PHENETHYL ALCOHOL—FDA approved food additive; FEMA GRAS; found in apple juice, banana, beef, beer, blackberry, blueberry, apple, apricot, asparagus; used in chewing gum, ice cream, baked goods.
466. PHENETHYL BUTYRATE—FDA approved food additive; FEMA GRAS; found in beer, banana, apple brandy, grape, strawberry, wine; used in baked goods, candy, ice cream.
467. PHENETHYL CINNAMATE—FEMA GRAS; used in non-alcoholic beverages, alcoholic beverages, ice cream, ices, baked goods, candy, gelatin and puddings.
468. PHENETHYL ISOBUTYRATE—FDA approved food additive; FEMA GRAS; found in beer, brandy, grape, olive, rum; used in chewing gum, baked goods, candy.
469. PHENETHYL ISOVALERATE—FDA approved food additive; FEMA GRAS; found in peppermint, spearmint, banana, beer, brandy, grape; used in chewing gum, candy, frozen dairy products.
470. PHENETHYL PHENYLACETATE—FDA approved food additive; FEMA GRAS; used in baked goods, candy, cheese.
471. PHENETHYL SALICYLATE—FDA approved food additive; FEMA GRAS; used in non-alcoholic beverages, alcoholic beverages, frozen dairy, baked goods, soft candy, gelatin and puddings.
472. 1-PHENYL-1-PROPANOL—FDA approved food additive; FEMA GRAS; found in beer, chicken broth, grape brandy, cocoa, guava, honey, lamb/mutton, mushroom; used in chewing gum, candy, baked goods.
473. 3-PHENYL-1-PROPANOL—FDA approved food additive; FEMA GRAS; found in cinnamon, honey, tea; used in frozen dairy, baked goods, soft candy, gelatin and puddings, chewing gum.
474. 2-PHENYL-2-BUTENAL—FEMA GRAS; found in beer, chicken, tomato, almonds, asparagus, cocoa, tea, hazelnuts; used in gelatin and puddings, candy, ice cream.
475. 4-PHENYL-3-BUTEN-2-OL—FDA approved food additive; FEMA GRAS; used in non-alcoholic beverages, frozen dairy, baked goods, soft candy, gelatin and puddings.
476. 4-PHENYL-3-BUTEN-2-ONE—FDA approved food additive; FEMA GRAS; found in beer, grape brandy, grape, guava, licorice, mango, mushroom, papaya, raspberry, strawberry, whiskey, wine; used in baked goods, candy.
477. PHENYLACETALDEHYDE—FDA approved food additive; FEMA GRAS; found in chicken, strawberry; used in baked goods, ice cream, candy.
478. PHENYLACETIC ACID—FDA approved food additive; FEMA GRAS; found in almond, asparagus, cocoa, coffee, mushroom, peanut, pork, potato chips, sesame seed, tea; used in sweet sauce, baked goods, candy.
479. 1-PHENYLALANINE—FDA approved food additive; FEMA GRAS; found in meats, eggs, breads, cereals, milk, cheese, fish, corn, beans, potatoes, asparagus, peas; used in frozen dairy, baked goods, candy, condiments, meat products.
480. 3-PHENYLPROPIONALDEHYDE—FDA approved food additive; FEMA GRAS; found in beer, chicken, tomato; used in baked goods, candy, condiments.
481. 3-PHENYLPROPIONIC ACID—FDA approved food additive; FEMA GRAS; found in beef, beer, blue cheese, grape brandy, wheat bread, broccoli, apricot, artichoke, asparagus, banana, beans; used in baked goods, candy.
482. 3-PHENYLPROPYL ACETATE—FDA approved food additive; FEMA GRAS; used in non-alcoholic beverages, ice cream, baked goods, candy, chewing gum, condiments.
483. 3-PHENYLPROPYL CINNAMATE—FDA approved food additive; FEMA GRAS; found in American storax, Peru balsam; used in non-alcoholic beverages, frozen dairy, baked goods, candy, gelatin and puddings.
484. 2-(3-PHENYLPROPYL)TETRAHYDROFURAN—FDA approved food additive; FEMA GRAS; used in baked goods, soft candy, gelatin and puddings, chewing gum.
485. PHOSPHORIC ACID—FEMA GRAS; component of living organisms; used in cheese, baked goods, candy, gelatin and puddings, meat products.
486. PIMENTA LEAF OIL—used in non-alcoholic beverages, ice cream, ices, candy, condiments, chewing gum, meat products.

487. PINE NEEDLE OIL—FDA approved food additive; FEMA GRAS; found in pine tree needles; used in candy, baked goods, ice cream.
488. PINE OIL, SCOTCH—FDA approved food additive; FEMA GRAS; found in pine trees; used in candy, baked goods, non-alcoholic beverages.
489. PINEAPPLE JUICE CONCENTRATE—Found in pineapple; defined as a fruit juice under FDA Standards of Identity.
490. alpha-PINENE—FDA approved food additive; FEMA GRAS; found in apple, blueberry, plum brandy, carrots, celery, cheddar cheese, chicken; used in condiments, candy, meat products.
491. beta-PINENE—FDA approved food additive; FEMA GRAS; found in apricot, plum brandy, butter, cantaloupe, carrots, celery, cheddar cheese, cocoa, cranberry; used in baked goods, candy, meat products.
492. D-PIPERITONE—FDA approved food additive; FEMA GRAS; found in blackberry, celery, raspberry; used in soft candy, baked goods, dairy products.
493. PIPERONAL—FDA GRAS; FEMA GRAS; found in cantaloupe, capers, melon, sherry; used in candy, baked goods.
494. PIPSISSEWA LEAF EXTRACT—FDA GRAS; FEMA GRAS; used in non-alcoholic beverages, candy.
495. PLUM JUICE—Found in plum.
496. POTASSIUM SORBATE—FDA GRAS; FEMA GRAS; found in mountain ash berries; used in cheese.
497. 1-PROLINE—FDA approved food additive; FEMA GRAS; essential amino acid, found in proteins, plants and animals; used in breakfast cereals, baked goods.
498. PROPENYLGUAETHOL—FDA approved food additive; FEMA GRAS; used in sweet sauce, baked goods, candy.
499. PROPIONIC ACID—FDA GRAS; FEMA GRAS; found in apple, apple juice, beef, beer, blueberry juice, bread, cheese, coffee, grape juice, maple syrup, orange juice, raspberry, rum; used in fruit, candy, gelatin and puddings, dairy products.
500. PROPYL ACETATE—FDA approved food additive; FEMA GRAS; found in banana, grape, apple juice, beer, wheat bread, cantaloupe, capers, cocoa, guava, honey, fig, honeydew melon, heated corn oil; used in beverages, ice cream, baked goods.
501. PROPYL para-HYDROXYBENZOATE—FDA approved food additive; FEMA GRAS; found in licorice; used in processed vegetables.
502. PROPYLENE GLYCOL—FDA GRAS; FEMA GRAS; found in sesame seed, mushroom; used in confection frostings, cheese, candy.
503. 3-PROPYLIDENEPHTHALIDE—FDA approved food additive; FEMA GRAS; found in lovage; used in frozen dairy products, baked goods, candy.
504. PRUNE JUICE AND CONCENTRATE—Common food item.
505. PYRIDINE—FDA approved food additive; FEMA GRAS; found in bean, bread, cheese, cocoa, coffee, fish, onion, peanut and pecan, popcorn, potato, rum, tea, tomato; used in ice cream, baked goods, condiments, meat products.
506. PYROLIGNEOUS ACID AND EXTRACT—FDA approved food additive; FEMA GRAS; found in birch tree; used in alcoholic beverages, baked goods, meat products.
507. PYRROLE—FEMA GRAS; found in wheat bread, beer, beef, chicken, steamed clams, cocoa, coffee; used in meat products, candy, baked goods.
508. PYRUVIC ACID—FDA approved food additive; FEMA GRAS; found in beer, wheat bread, celery, asparagus, milk, onion, sake; used in frozen dairy products, baked goods, candy.
509. RAISIN JUICE CONCENTRATE—common food item; found in raisin; used in baked goods.
510. RHODINOL—FDA approved food additive; FEMA GRAS; found in geranium flowers; used in chewing gum, baked goods, ice cream.
511. ROSE ABSOLUTE AND OIL—FDA GRAS; FEMA GRAS; found in roses; used in chewing gum, ice cream, baked goods.
512. ROSEMARY OIL—FDA GRAS; FEMA GRAS; found in rosemary; used in condiments, meat products, baked goods.
513. RUM. Alcoholic beverages; natural flavor.
514. RUM ETHER—FDA approved food additive; FEMA GRAS; found in rum; used in non-alcoholic beverages, alcoholic beverages, frozen dairy, baked goods, candy.
515. RYE EXTRACT—found in rye; common food item.
516. SAGE, SAGE OIL, AND SAGE OLEORESIN—FDA GRAS; FEMA GRAS; found in sage; used in baked goods, condiments, meat products.
517. SALICYLALDEHYDE—FDA approved food additive; FEMA GRAS; found in beer, butter, chicken, coffee, cranberry, grape, potato, rum, sherry, tea, tomato, whiskey; used in baked goods, condiments, candy.
518. SANDALWOOD OIL, YELLOW—FDA approved food additive; FEMA GRAS; found in sandalwood; used in candy, baked goods, ice cream.
519. SCLAREOLIDE—FEMA GRAS; found in clary sage; used in milk products, baked goods, candy, meat products, breakfast cereals.
520. SKATOLE—FDA approved food additive; FEMA GRAS; found in cheese, egg, fish, tea; used in frozen dairy, soft candy, gelatin and puddings, baked goods.
521. SMOKE FLAVOR—Found in hickory-wood smoke distillate; used in baked goods, cheese, meats.
522. SNAKEROOT OIL—FDA approved food additive; FEMA GRAS; found in wild ginger; used in beverages, ice cream, candy, condiments.
523. SODIUM ACETATE—FDA GRAS; FEMA GRAS; found in plant and animal tissues; used in cereals, pastas, snack foods, candy, meat products, soups.
524. SODIUM BENZOATE—FDA GRAS; FEMA GRAS; used in baked goods, margarine, dietary supplements.
525. SODIUM BICARBONATE—FDA GRAS; natural mineral; main component of baking powder and baking soda.
526. SODIUM CARBONATE—FDA GRAS; used in baked goods, desserts, margarine, poultry.
527. SODIUM CHLORIDE—FDA GRAS; used in brewing, baked goods, butter, cheese, poultry.
528. SODIUM CITRATE—FDA GRAS; FEMA GRAS; used in evaporated milk, general purpose food additive.
529. SODIUM HYDROXIDE—FDA GRAS; used in meat and poultry, oleo and margarine.
530. SOLANONE—Found in black currant buds.
531. SPEARMINT OIL—FDA GRAS; FEMA GRAS; found in spearmint; used in chewing gum, ice cream, candy, baked goods.
532. STYRAX EXTRACT, GUM AND OIL—FDA approved food additive; FEMA GRAS; found in storax; used in baked goods, candy, jellies.
533. SUCROSE OCTAACETATE—FDA approved food additive; FEMA GRAS; found in ginger ale; used in candy, gelatin and puddings, baked goods.

534. SUGAR ALCOHOLS—FDA GRAS; FEMA GRAS; found in cherry, plum, apple; used in soft candy. Maltitol is a sugar permitted by FDA for use in chewing gum, diabetic chocolate and whipped non-dairy topping.

535. SUGARS—FDA GRAS; FEMA GRAS; found in food sugar sources; used in baked goods, candy, breakfast cereals.

536. TAGETES OIL—FDA approved food additive; FEMA GRAS; found in marigold flowers; used in condiment relish.

537. TANNIC ACID—FDA GRAS; FEMA GRAS; found in bark of many fruits and plants; used in baked goods, gelatins, puddings and fillings, frozen dairy desserts, candy, meat products.

538. TARTARIC ACID—FDA GRAS; FEMA GRAS; found in wine grapes; used in fruit juices, baked goods, ice cream.

539. TEA LEAF AND ABSOLUTE—FDA GRAS; natural flavor extractive.

540. alpha-TERPINEOL—FDA approved food additive; FEMA GRAS; found in apple, apple juice, apricot, artichoke, beans, beef, beli, bilberry, blueberry, plum brandy; used in chewing gum, baked goods, ice cream.

541. TERPINOLENE—FDA approved food additive; FEMA GRAS; found in thyme, valencia oranges; used in baked goods, ice cream, candy.

542. TERPINYL ACETATE—FDA approved food additive; FEMA GRAS; found in apricot, beer, blackberry, carrots, celery, cranberry, gin, ginger; used in meat products, baked goods, candy.

543. 5,6,7,8-TETRAHYDROQUINOXALINE—FEMA GRAS; found in beef, wheat bread, cocoa, peanut, pork; used in candy, baked goods, dairy products.

544. 1,5,5,9-TETRAMETHYL-13-OXATRICYCLO (8.3.0.0(4,9))TRIDECANE—FEMA GRAS; found in clary sage oil; used in non-alcoholic beverages, ice cream, ices, baked goods, candy, gelatin and puddings.

545. 2,3,4,5 AND 3,4,5,6-TETRAMETHYLETHYL-CYCLOHEXANONE—FDA approved food additive; FEMA GRAS; used in non-alcoholic beverages, ice cream, ices, candy, baked goods.

546. 2,3,5,6-TETRAMETHYLPYRAZINE—FEMA GRAS; found in wheat bread, Sake, shrimp, beef, beer, coffee, peanut; used in baked goods, dairy products, candy.

547. THIAMINE HYDROCHLORIDE—FDA GRAS; FEMA GRAS; found in rice husk, cereal grains, yeast, liver, eggs; nutrient supplement in food.

548. THIAZOLE—FEMA GRAS; found in coffee aroma, component of the structure of vitamin B1 (Thiamine) which occurs in seeds, meat and milk.

549. 1-THREONINE—FDA approved food additive; found in eggs, skim milk, nuts, oranges and lemons.

550. THYME OIL, WHITE AND RED—FDA GRAS; FEMA GRAS; found in thyme; used in condiments, meats, soups, baked goods.

551. THYMOL—FDA approved food additive; FEMA GRAS; found in blueberry, romano cheese, papaya, peppermint, pistacia, fruit tea, wine; used in candy, baked goods, ice cream.

552. TOBACCO EXTRACTS—Natural to tobacco; used as flavorants at minimal levels, producing no measurable increase in nicotine in cigarettes.

553. TOCHPHEROLS (MIXED)—FDA GRAS; found in spinach, soybeans, cashews; used in pump-cured bacon.

554. TOLU BALSAM GUM AND EXTRACT—FDA approved food additive; FEMA GRAS; found in balsam tolu; used in baked goods, candy, syrups.

555. TOLUALDEHYDES (ortho,meta,para)—FDA approved food additive; FEMA GRAS; found in beef, beer, butter, coffee, endive, rum, tea; used in chewing gum; baked goods, ice cream.

556. para-TOLYL 3-METHYLBUTYRATE—FEMA GRAS; found in raspberry, coffee, tea, rum; used in baked goods, ice cream, candy.

557. para-TOLYL ACETALDEHYDE—FEMA GRAS; used in ice cream, ices, candy, baked goods.

558. para-TOLYL ACETATE—FDA approved food additive; FEMA GRAS; found in cananga, Ylang Ylang; used in candy, ice cream, baked goods.

559. para-TOLYL ISOBUTYRATE—FDA approved food additive; FEMA GRAS; used in baked goods, ice cream, candy.

560. para-TOLYL PHENYLACETATE—FDA approved food additive; FEMA GRAS; used in baked goods, candy, cheese, ice cream.

561. TRIACETIN—FDA GRAS; FEMA GRAS; found in papaya; used in candy, baked goods, ice cream.

562. 2-TRIDECANONE—FEMA GRAS; found in cheese, coffee, coconut oil, hops; used in ice cream, ices, baked goods, candy.

563. 2-TRIDECENAL—FDA approved food additive; FEMA GRAS; found in sunguli oil; used in non-alcoholic beverages, ice cream, ices, candy, baked goods, chewing gum.

564. TRIETHYL CITRATE—FDA GRAS; FEMA GRAS; found in red currant; used in chewing gum, baked goods, ice cream.

565. 3,5,5-TRIMETHYL-1-HEXANOL—FEMA GRAS; used in baked goods, condiments, pickles.

566. para,alpha,alpha-TRIMETHYLBENZYL ALCOHOL—FEMA GRAS; found in apricots, blackberry, grape brandy, grapefruit juice, honey, peppermint, pineapple, plum, tomato; used in beverages, candy, gelatins and puddings.

567. 4-(2,6,6-TRIMETHYLCYCLOHEX-1-ENYL)BUT-2-EN-4-ONE—FEMA GRAS; found in rose, rum, brandy, tea; used in baked goods, candy, chewing gum.

568. 2,6,6-TRIMETHYLCYCLOHEX-2-ENE-1,4-DI-ONE—FEMA GRAS; found in apricot, beer, blackberry, grape, hops, kiwi fruit; used in soft candy.

569. 2,6,6-TRIMETHYLCYCLOHEXA-1,3-DIENYL METHAN; FEMA GRAS; used in candy, baked goods, condiments, pickles, preserves and spreads.

570. 4-(2,6,6-TRIMETHYLCYCLOHEXA-1,3-DIENYL) BUT-2-EN-4-ONE; FEMA GRAS; found in apples, black tea, Riesling wine; used in beverages, frozen dessert, baked goods, candy, gelatin and puddings, preserves, condiments.

571. 2,2,6-TRIMETHYLCYCLOHEXANONE—FEMA GRAS; found in bilberry, passion fruit, tea; used in non-alcoholic beverages, frozen dessert, confectionery, ice cream, ices, candy.

572. 2,3,5-TRIMETHYLPYRAZINE—FEMA GRAS; found in barley, almond, asparagus, beef, wheat bread, chicken, cocoa, coffee; used in baked goods, candy, dairy products, cereals.

573. 1-TYROSINE—FDA approved food additive; FEMA GRAS; found in nuts, oranges and lemons.

574. delta-UNDECALACTONE—FEMA GRAS; found in beef, butter, coconut, milk; used in baked goods, candy, dairy products, cereals.

575. gamma-UNDECALACTONE—FDA approved food additive; FEMA GRAS; found in apple, apple juice, apricot, heated butter, peach, plum, pork, rice; used in chewing gum, candy, ice cream, baked goods.
576. UNDECANAL—FDA approved food additive; FEMA GRAS; found in mandarin, grapefruit and lemon; used in baked goods, chewing gum.
577. 2-UNDECANONE—FDA approved food additive; FEMA GRAS; found in coconut oil, banana, beer, beef, cheese, cocoa, coffee, wine, milk, mushroom, peanut, strawberry; used in non-alcoholic beverages, ice cream, baked goods, candy, dairy products.
578. 10-UNDECENAL—FDA approved food additive; FEMA GRAS; used in non-alcoholic beverages, ice cream, ices, candy.
579. UREA—FDA GRAS; found in mushrooms; used in baked goods.
580. VALENCENE—FEMA GRAS; found in grapefruit juice, mango, mangosteen, orange juice, cocoa; used in breakfast cereals, candy, baked goods.
581. VALERALDEHYDE—FDA approved food additive; FEMA GRAS; found in apple, apple juice, apricot, artichoke, asparagus, avocado, banana, beef, blue cheese; used in candy, baked goods, ice cream.
582. VALERIAN ROOT EXTRACT, OIL AND POWDER—FDA approved food additive; FEMA GRAS; found in valerian root; used in baked goods, chewing gum.
583. VALERIC ACID—FDA approved food additive; FEMA GRAS; found in banana, beef, beer, blue cheese, blueberry, wheat bread, butter; used in imitation dairy goods.
584. gamma-VALEROLACTONE—FEMA GRAS; found in beef, beer, cocoa, coffee, mushroom, peach, peanut, wheat bread, heated butter, honey; used in candy, meat products, baked goods.
585. VALINE—FDA approved food additive; FEMA GRAS; found in plants, lemons, oranges, grapefruits; used in ice cream, candy, baked goods.
586. VANILLA EXTRACT AND OLEORESIN—FDA GRAS; FEMA GRAS; found in vanilla bean; used in baked goods, gelatin and puddings, condiments.
587. VANILLIN—FDA GRAS; FEMA GRAS; found in asparagus, barley, beer, brandy, blackberry, blueberry, coffee, cranberry; used in confection frosting, baked goods, candy.
588. VERATRALDEHYDE—FDA approved food additive; FEMA GRAS; found in coffee, raspberry; used in baked goods, ice cream, candy.
589. VETIVER OIL—FDA approved food additive; found in vetiver flowers.
590. VINEGAR—Derived from fermentable sugars such as fruit juices and honey; used in catsup, mayonnaise, pickles.
591. VIOLET LEAF ABSOLUTE—FDA GRAS; FEMA GRAS; found in violets; used in baked goods, ice cream, candy.
592. WALNUT HULL EXTRACT—FDA approved food additive; FEMA GRAS; found in walnuts; used in breakfast cereals, ice cream, candy.
593. WATER.
594. WHEAT EXTRACT AND FLOUR—common food component.
595. WILD CHERRY BARK EXTRACT—FDA GRAS; FEMA GRAS; found in cherry trees; used in alcoholic beverages, non-alcoholic beverages, candy, ice cream.
596. WINE AND WINE SHERRY—common beverages, found in grape fermentation/distillation.
597. XANTHAN GUM—FDA approved food additive; produced by carbohydrate fermentation; used in baked goods, beverages, fish, milk, products, poultry.
598. 3,4-XYLENOL—FEMA GRAS; found in coffee, wood vinegar; used in baked goods, meat, soups, coffee, nuts.
599. YEAST—FDA approved food additive.

In all of these cases in which BNPD is used as a preservative in combination with a GRAS additive, the molar ratio of GRAS additive:BNPD may be on the order of 40-10:1 with a more preferred ratio of about 15-5:1 GRAS additive:BNPD. Preferably, the BNPD and GRAS additive are in aqueous solution or dispersion form.

While the invention has been described herein with respect to specific embodiments of same, such are not intended to limit the scope of the invention. The invention is intended to cover any equivalents, modifications, etc., and is to be limited solely by the scope of the appended claims.

What is claimed is:

1. A method of inhibiting corrosion in a boiler water system comprising adding to said system an effective amount of a treatment comprising lecithin and 2-bromo-2-nitropropane-1,3 diol (BNPD); wherein said lecithin is present in a molar amount of about 5-40 moles of lecithin per 1 mole of BNPD.

2. A method of inhibiting corrosion in a boiler water system as recited in claim 1, said boiler water system comprises a stream condensate return section, and wherein said method inhibits corrosion of metallurgical parts in contact with said steam condensate.

3. A method of inhibiting corrosion as recited in claim 2 comprising adding about 0.1-1,000 ppm of said treatment to said system.

4. A method as recited in claim 3 comprising adding about 1-500 ppm of said treatment to said system.

5. A method as recited in claim 4 comprising adding about 1-100 ppm of said treatment to said system.

6. A method of inhibiting corrosion as recited in claim 1 wherein said lecithin is present in a molar amount of about 10-40 moles lecithin per mole of BNPD.

* * * * *